United States Patent
Yamaki et al.

(10) Patent No.: US 7,964,251 B2
(45) Date of Patent: Jun. 21, 2011

(54) LIQUID CRYSTAL DISPLAY DEVICE

(75) Inventors: Takeyuki Yamaki, Heguri-cho (JP); Hiroshi Yokogawa, Hirakata (JP); Akira Tsujimoto, Ikoma (JP); Ryozo Fukuzaki, Kobe (JP); Tetsuya Toyoshima, Takaoka (JP); Masanori Yoshihara, Kawasaki (JP); Kohei Arakawa, Machida (JP)

(73) Assignee: Panasonic Electric Works Co., Ltd., Kadoma-Shi (JP)

( * ) Notice: Subject to any disclaimer, the term of this patent is extended or adjusted under 35 U.S.C. 154(b) by 1037 days.

(21) Appl. No.: 11/793,382

(22) PCT Filed: Dec. 26, 2005

(86) PCT No.: PCT/JP2005/024215
§ 371 (c)(1),
(2), (4) Date: Jun. 18, 2007

(87) PCT Pub. No.: WO2006/068331
PCT Pub. Date: Jun. 29, 2006

(65) Prior Publication Data
US 2008/0094326 A1    Apr. 24, 2008

(30) Foreign Application Priority Data
Dec. 24, 2004  (JP) ................. 2004-374923

(51) Int. Cl.
G09G 3/36    (2006.01)
(52) U.S. Cl. ............ 428/1.1; 428/1.3; 428/1.31; 349/99
(58) Field of Classification Search ............... 428/1.1, 428/3, 1.31–1.321; 349/96, 99, 117–119, 349/122, 141
See application file for complete search history.

(56) References Cited

U.S. PATENT DOCUMENTS

| | | | |
|---|---|---|---|
| 6,060,183 A * | 5/2000 | Higashi et al. | 428/701 |
| 6,115,095 A | 9/2000 | Suzuki et al. | |
| 6,184,957 B1 * | 2/2001 | Mori et al. | 349/118 |
| 6,285,430 B1 | 9/2001 | Saito | |
| 6,795,246 B2 | 9/2004 | Yano et al. | |
| 2003/0016446 A1 | 1/2003 | Yano et al. | |
| 2004/0032547 A1 | 2/2004 | Yano et al. | |

(Continued)

FOREIGN PATENT DOCUMENTS

EP    1 798 593 A1    6/2007

(Continued)

OTHER PUBLICATIONS

C. Destrade et al., Mol. Cryst. Liq. Cryst., 1981, vol. 71, pp. 111-135.

(Continued)

*Primary Examiner* — Sophie Hon
(74) *Attorney, Agent, or Firm* — Birch, Stewart, Kolasch & Birch, LLP

(57) ABSTRACT

A liquid crystal display device of an in-plane switching mode comprises a pair of polarizing plates which are constituted with a polarizing plate at the output side comprising a polarizer at the output side and a polarizing plate at the incident side comprising a polarizer at the incident side having a transmission axis approximately perpendicular to a transmission axis of the polarizer at the output side and two or more sheets of optically anisotropic members and liquid crystal cells disposed between the pair of polarizing plates. The device exhibits excellent scratch resistance and excellent quality of black depth and uniform and high contrast in viewing at any angles.

15 Claims, 4 Drawing Sheets

U.S. PATENT DOCUMENTS

2005/0175796 A1* 8/2005 Nakamura et al. ........... 428/32.8
2007/0285599 A1 12/2007 Oxude

FOREIGN PATENT DOCUMENTS

| | | |
|---|---|---|
| JP | 10-54982 A | 2/1998 |
| JP | 11-305217 A | 11/1999 |
| JP | 2003-029038 A | 1/2003 |
| JP | 2003-255136 A | 9/2003 |
| JP | 2003-344603 A | 12/2003 |
| JP | 2004-004642 A | 1/2004 |
| JP | 2004-212525 A | 7/2004 |
| JP | 2004-258267 A | 9/2004 |
| WO | WO 03/093878 A2 * | 11/2003 |

OTHER PUBLICATIONS

B. Kohne et al., Angew. Chem., vol. 96, nr.1, (1984), pp. 70-71.
J. M. Lehn et al., J. Chem. So., Chem. Commun., No. 24, Dec. 15, 1985, pp. 1794-1796.
J. Zhang et al., J. Am. Chem. Sci. vol. 116, No. 6, Mar. 23, 1994, pp. 2655-2556.

* cited by examiner

LIQUID CRYSTAL DISPLAY DEVICE

This application is a 371 of PCT/JP05/24215 filed on Dec. 26, 2005.

TECHNICAL FIELD

The present invention relates to a liquid crystal display device. More particularly, the present invention relates to a liquid crystal display device which has excellent antireflection property and scratch resistance, prevents a decrease in the contrast in viewing the display screen in oblique directions while the properties of images in viewing in the front direction are not adversely affected and exhibits excellent quality of black depth and uniform and high contrast in viewing in any desired directions.

BACKGROUND ART

Liquid crystal display devices are characterized by the high quality of images, the small thickness, the light weight and the small consumption of electric power and widely used for televisions, personal computers and automobile navigators. In a liquid crystal display device, two polarizers are disposed above and below a liquid crystal cell in a manner such that the transmission axes are perpendicular to each other. Images are exhibited on a display by changing orientation of liquid crystal molecules under application of a voltage to the liquid crystal cell. Many of the liquid crystal display devices of the twisted nematic mode have a construction such that the liquid crystal molecules are oriented perpendicularly under application of a voltage to exhibit a dark display. Many of the liquid crystal display devices of the in-plane switching mode have a construction such that the liquid crystal molecules are oriented in a specific direction in the absence of a voltage, and the direction of the orientation is rotated by 45 degrees under application of a voltage to exhibit a bright display.

In a liquid crystal display device in which the transmission axes of two polarizers are oriented in a manner such that one of the transmission axes is in the vertical direction, the other is in the horizontal direction, and the two axes are perpendicular to each other, a sufficient contrast can be obtained when the display screen is viewed in the horizontal and vertical directions. However, when the display screen is viewed in an oblique direction deviated from the horizontal and vertical directions, birefringence takes place in the transmitted light, and leak of light arises. Therefore, a sufficient black depth is not obtained, and the contrast decreases. To overcome this problem, prevention of the decrease in the contrast is attempted by adding a means for optical compensation to the liquid crystal display device.

For example, a liquid crystal device of the in-plane switching mode in which the first polarizing plate, a film for optical compensation, the first substrate, a liquid crystal layer, the second substrate and the second polarizing plate are disposed in this order, one of the polarizing plate has a transmission axis parallel to the slow axis of the liquid crystal during the dark display of the liquid crystal layer, the other polarizing plate has a transmission axis perpendicular to the slow axis of the liquid crystal during the dark display of the liquid crystal layer, and the angle between the film slow axis of the film for optical compensation and the transmission axis of one of the polarizing plates is 0 to 2 degrees or 88 to 90 degrees, is proposed (Patent Reference 1).

A liquid crystal display device which comprises a liquid crystal cell and polarizing plates and changes the direction of the major axis of the molecules of the liquid crystal within a plane parallel to the substrate by the change in the voltage applied to the liquid crystal cell, wherein a sheet for optical compensation is disposed between the liquid crystal cell and at least one of the polarizing plates, the sheet for optical compensation has the optically negative uniaxial property, and the optical axis is parallel to the face of the sheet, is proposed (Patent Reference 2).

However, none of these means are sufficient for obtaining a liquid crystal device exhibiting uniform and high contrast in viewing in any desired directions, and a further improvement has been desired.

[Patent Reference 1] Japanese Patent Application Laid-Open No. Heisei 11 (1999)-305217 (pages 2 and 3) (U.S. Pat. No. 6,285,430, B1)

[Patent Reference 2] Japanese Patent Application Laid-Open No. Heisei 10 (1998)-54982 (pages 2 and 3) (U.S. Pat. No. 6,184,957, B1)

DISCLOSURE OF THE INVENTION

The present invention has an object of providing a liquid crystal device which prevents a decrease in the contrast in viewing the display screen in oblique directions while the properties of images in viewing in the front direction are not adversely affected and exhibits excellent quality of black depth and uniform and high contrast in viewing in any desired directions.

As the result of intensive studies by the present inventors to achieve the above object, it was found that a liquid crystal display device of the in-plane switching mode comprising a pair of polarizing plates which were constituted with a polarizing plate at the output side comprising a polarizer at the output side and a polarizing plate at the incident side comprising a polarizer at the incident side having a transmission axis approximately perpendicular to a transmission axis of the polarizer at the output side and at least two sheets of optically anisotropic members and liquid crystal cells disposed between the pair of polarizing plates, wherein the sum of the major in-plane refractive indices was twice the sum of the major refractive index in the direction of thickness or smaller in the optically anisotropic member, the ratio of retardation of light incident at an angle inclined by 40 degrees with respect to a normal toward the major axis ($R_{40}$) to the retardation incident perpendicularly ($R_0$) was 0.90~1.10, the polarizer at the output side had a protective film on the surface, and the device comprised a low refractive index layer which had a refractive index of 1.37 or smaller, comprised a cured coating film of silicone comprising hollow fine particles or porous fine particles and was disposed at the side of observation of the face of the protective film at the side of observation of the polarizer, provided excellent quality of black depth in viewing in any desired directions and exhibited uniform and high contrast. The present invention has been completed based on the knowledge.

The present invention provides:

(1) A liquid crystal display device of an in-plane switching mode which comprises a pair of polarizing plates, which are constituted with a polarizing plate at an output side comprising a polarizer at an output side and a polarizing plate at an incident side comprising a polarizer at an incident side having a transmission axis approximately perpendicular to a transmission axis of the polarizer at an output side, and k sheets (k representing an integer of 2 or greater) of optically anisotropic members and liquid crystal cells which are disposed between the pair of polarizing plates, wherein a relation:

$(\Sigma n_{xi} + \Sigma n_{yi})/2 \leq \Sigma n_{zi}$ is satisfied, wherein major in-plane refractive indices of an i-th optically anisotropic member are represented by $n_{xi}$ and $n_{yi}$ ($n_{xi}>n_{yi}$), a major refractive index in a direction of thickness is represented by $n_{zi}$, and $\Sigma$ shows a sum for i=1~k;
a relation:

$$0.90<R_{40}/R_{40}<1.10$$

is satisfied, wherein, in Optical laminate (O) formed by laminating k sheets of optically anisotropic members and liquid crystal cells, a retardation of light having a wavelength of 550 nm incident perpendicularly is represented by $R_0$, and a retardation of light having a wavelength of 550 nm incident at an angle inclined by 40 degrees with respect to a normal toward a major axis is represented by $R_{40}$; and the polarizing plate at an output side comprises protective films disposed on both faces of the polarizer at an output side and a low refractive index layer which has a refractive index of 1.37 or smaller, comprises a cured coating film of a silicone comprising hollow fine particles or porous fine particles and is disposed at a side of observation of a face of the protective film at a side of observation of the polarizer at an output side;

(2) The liquid crystal display device described in (1), wherein the low refractive index layer is a cured coating film of a coating material composition which comprises the hollow fine particles or the porous fine particles, at least one of a hydrolyzate shown in (A) in the following and a copolymer hydrolyzate shown in (B) in the following, and a hydrolyzable organosilane shown in (C) in the following:

(A) A hydrolyzate obtained by hydrolysis of a hydrolyzable organosilane represented by general formula [1]:

$$SiX_4 \quad [1]$$

wherein X represents a hydrolyzable group;
(B) A copolymer hydrolyzate obtained by hydrolysis of a copolymer of a hydrolyzable organosilane represented by general formula [1] and a hydrolyzable organosilane having an alkyl group substituted with fluorine atom; and
(C) A hydrolyzable organosilane having a water-repelling group at a linear chain portion and two or more silicon atoms having a bonded alkoxyl group in a molecule;
(3) The liquid crystal display device described in (2), wherein the water-repelling group in the hydrolyzable organosilane shown in (C) has a structure represented by general formula [2] or [3]:

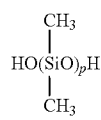

[2]

wherein $R^1$ and $R^2$ represent alkyl groups, and n represents an integer of 2 to 200;

$$-(CF_2)_m- \quad [3]$$

wherein m represents an integer of 2 to 20;
(4) The liquid crystal display device described in (1), wherein the low refractive index layer is a cured coating film of a coating material composition which comprises the hollow fine particles or the porous fine particles, at least one of a hydrolyzate shown in (A) in the following and a copolymer hydrolyzate shown in (B) in the following, and a siliconediol shown in (D) in the following:
(A) A hydrolyzate obtained by hydrolysis of a hydrolyzable organosilane represented by general formula [1]:

$$SiX_4 \quad [1]$$

wherein X represents a hydrolyzable group;
(B) A copolymer hydrolyzate obtained by hydrolysis of a copolymer of a hydrolyzable organosilane represented by general formula [1] and a hydrolyzable organosilane having an alkyl group substituted with fluorine atom;
(D) A siliconediol of a dimethyl type represented by general formula [4]:

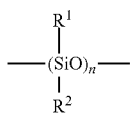

[4]

wherein p represents a positive integer;
(5) The liquid crystal display device described in (4), wherein p represents an integer of 20 to 100;
(6) The liquid crystal display device described in (1), wherein the low refractive index layer is a cured coating film of a coating material composition which comprises a re-hydrolyzate, which is obtained by hydrolysis of a hydrolyzate shown in (A) in the following in a condition such that the hydrolyzate is mixed with the hollow fine particles or the porous fine particles, and a copolymer hydrolyzate shown in (B) in the following:
(A) A hydrolyzate obtained by hydrolysis of a hydrolyzable organosilane represented by general formula [1]:

$$SiX_4 \quad [1]$$

wherein X represents a hydrolyzable group; and
(B) A copolymer hydrolyzate obtained by hydrolysis of a copolymer of a hydrolyzable organosilane represented by general formula [1] and a hydrolyzable organosilane having an alkyl group substituted with fluorine atom;
(7) The liquid crystal display device described in any one of (2) and (4), wherein the porous fine particles comprised in the coating material composition forming the low refractive index layer are (a) porous particles which are obtained by mixing an alkoxysilane with a solvent, water and a catalyst for polymerization with hydrolysis, followed by polymerizing the mixture with hydrolysis and then removing the solvent, (b) porous particles having an average diameter of aggregation of 10 to 100 nm which are obtained by mixing an alkoxysilane with a solvent, water and a catalyst for polymerization with hydrolysis, followed by polymerizing the mixture with hydrolysis, stabilizing a formed organosilica sol by terminating the polymerization before formation of a gel and then removing the solvent from the organosilica sol, or a mixture of porous particles (a) and (b);
(8) The liquid crystal display device described in any one of (2) and (4), wherein hydrolyzate shown in (A) obtained by hydrolysis of the hydrolyzable organosilane represented by general formula [1] is a partial hydrolyzate or a complete hydrolyzate having a weight-average molecular weight of 2,000 or greater which is obtained by hydrolysis of the hydrolyzable organosilane represented by general formula [1] in presence of water in an amount such that a ratio of amounts by mole [H$_2$O]/[X] is 1.0 to 5.0 and an acid catalyst;
(9) The liquid crystal display device described in (1), wherein the transmission axis of the polarizer at an output side or the transmission axis of the polarizer at an incident side, and a slow axis of Optical laminate (O) are approximately parallel or perpendicular to each other;

(10) The liquid crystal display device described in (1), wherein a slow axis of the optically anisotropic member and a slow axis of liquid crystal molecules in the liquid crystal cell under application of no voltage are approximately parallel or perpendicular to each other;
(11) The liquid crystal display device described in (1), wherein at least one of the optically anisotropic members is a layer comprising a material having a negative intrinsic birefringence;
(12) The liquid crystal display device described in (1), wherein at least one of the optically anisotropic members is a layer comprising discotic liquid crystal molecules or lyotropic liquid crystal molecules; and
(13) The liquid crystal display device described in (1), wherein at least one of the optically anisotropic members is a layer comprising a photo-isomerizable substance.

THE MOST PREFERRED EMBODIMENT TO CARRY OUT THE INVENTION

Figure 1:
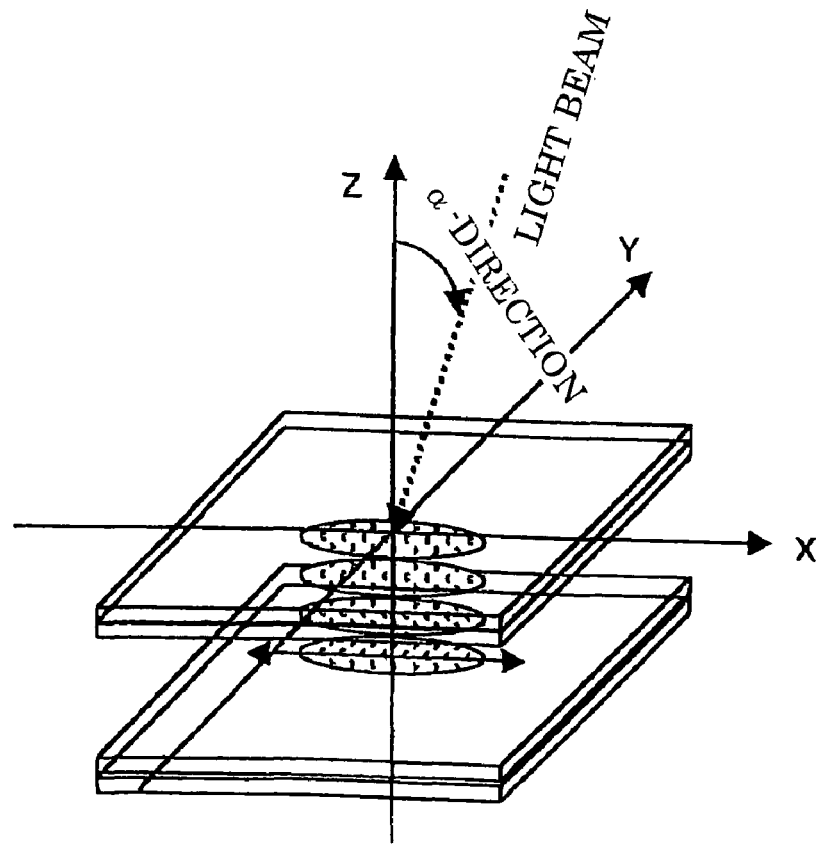
FIG. 1 shows a diagram describing the method for measuring the retardation $R_{40}$.
Figure 1:
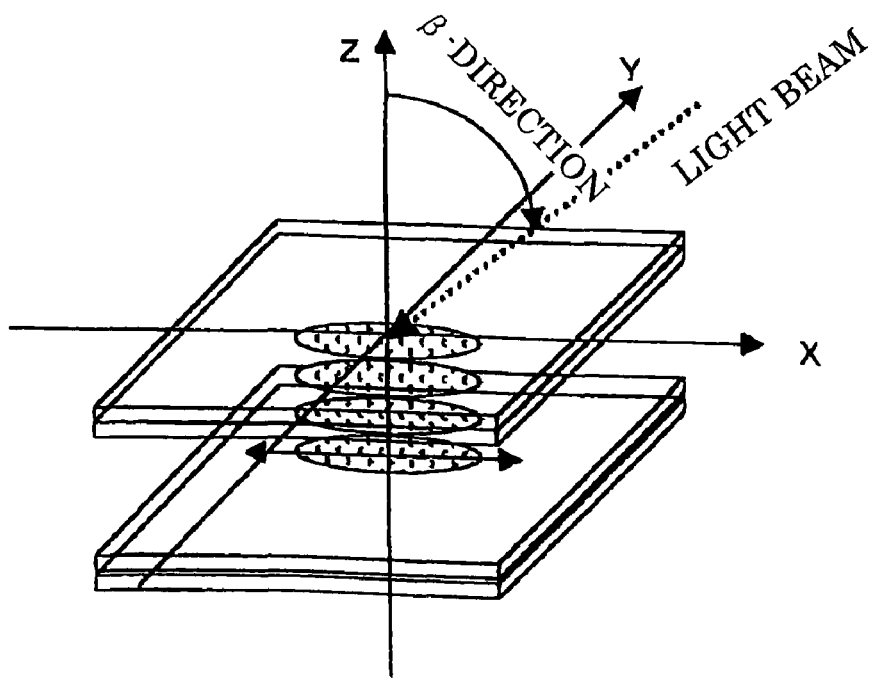
Figure 2:
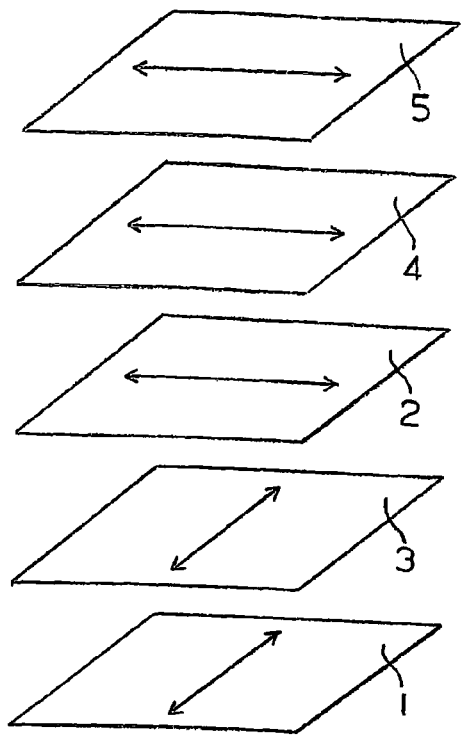
FIG. 2 shows a diagram exhibiting an embodiment of the layer construction of the liquid crystal display device of the present invention.
Figure 3:
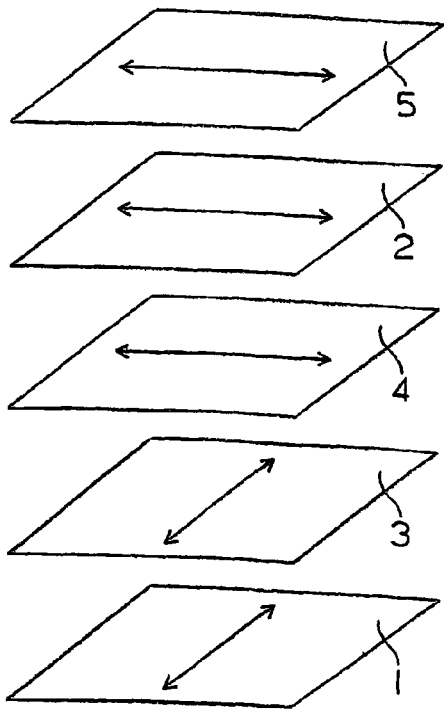
FIG. 3 shows a diagram exhibiting another embodiment of the layer construction of the liquid crystal display device of the present invention.
Figure 4:
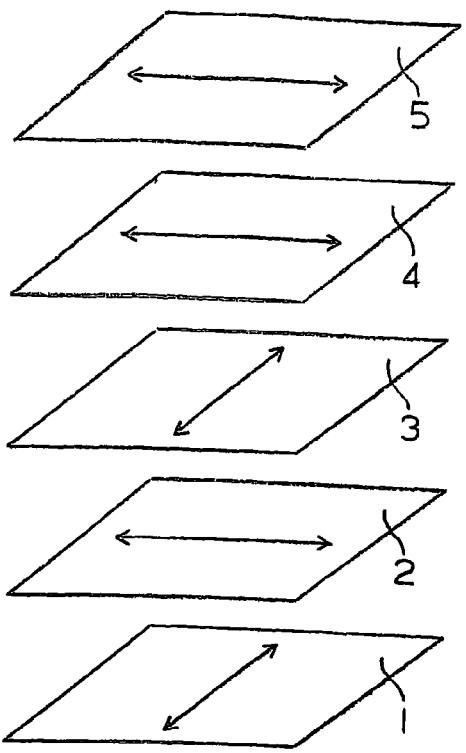
FIG. 4 shows a diagram exhibiting still another embodiment of the layer construction of the liquid crystal display device of the present invention.
Figure 5:
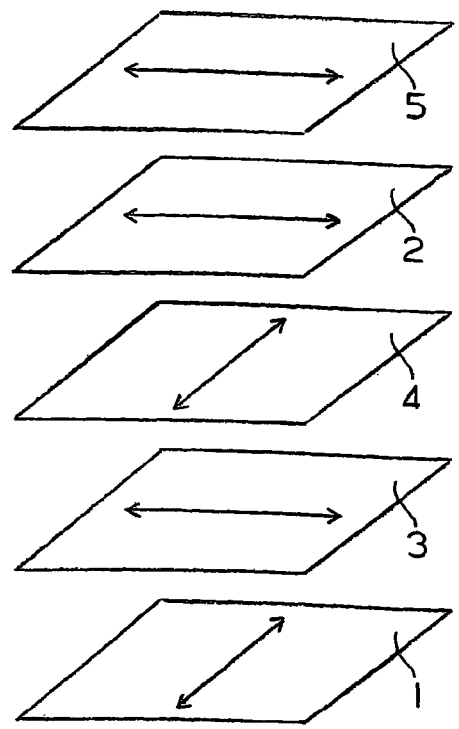
FIG. 5 shows a diagram exhibiting still another embodiment of the layer construction of the liquid crystal display device of the present invention.

The liquid crystal display device of the present invention is a liquid crystal display device of an in-plane switching mode which comprises a pair of polarizing plates, which are constituted with a polarizing plate at the output side comprising a polarizer at the output side and a polarizing plate at the incident side comprising a polarizer at the incident side having a transmission axis approximately perpendicular to a transmission axis of the polarizer at the output side, and k sheets (k representing an integer of 2 or greater) of optically anisotropic members and liquid crystal cells which are disposed between the pair of polarizing plates, wherein
a relation:

$$(\Sigma n_{xi} + \Sigma n_{yi})/2 \leq \Sigma n_{zi}$$

is satisfied, wherein the major in-plane refractive indices of an i-th optically anisotropic member are represented by $n_{xi}$ and $n_{yi}$ ($n_{xi} > n_{yi}$), the major refractive index in the direction of thickness is represented by $n_{zi}$, and $\Sigma$ shows a sum for i=1~k;
a relation:

$$0.90 < R_{40}/R_0 < 1.10$$

is satisfied, wherein, in optical laminate (O) formed by laminating k sheets of optically anisotropic members and liquid crystal cells, a retardation of light having a wavelength of 550 nm incident perpendicularly is represented by $R_0$, and a retardation of light having a wavelength of 550 nm incident at an angle inclined by 40 degrees with respect to the normal toward the major axis is represented by $R_{40}$; and
the polarizing plate at the output side comprises protective films disposed on both faces of the polarizer at the output side and a low refractive index layer which has a refractive index of 1.37 or smaller, comprises a cured coating film of a silicone comprising hollow fine particles or porous fine particles and is disposed at the side of observation of the face of the protective film at the side of observation of the polarizer at the output side.

In the present invention, when the angle between the two transmission axes of the polarizer at the output side and the polarizer at the incident side, which are disposed in a manner such that the transmission axes are approximately perpendicular to each other, is expressed in the range of 0 to 90 degrees, it is preferable that the angle is 87 to 90 degrees and more preferably 89 to 90 degrees. When the angle between the two transmission axes of the polarizer at the output side and the polarizer at the incident side is smaller than 87 degrees, light leaks, and there is the possibility that the quality of black depth on the display screen decreases.

The optically anisotropic member used in the present invention comprises a substance having major refractive indices $n_x$, $n_y$ and $n_z$ at least one of which is different from the others. In the optically anisotropic member, when the light emitted from a single source of a single color proceeds in one direction, the light proceeds as two separate polarized lights having different speeds, and the directions of oscillation of the two polarized lights are perpendicular to each other.

In the present invention, the arrangement of the k sheets of optically anisotropic members and liquid crystal cells disposed between a pair of polarizing plates is not particularly limited, and the liquid crystal cells can be disposed at desired positions relative to the k sheets of the optically anisotropic members. For example, when two sheets of optically anisotropic members and a liquid crystal cell are used, the sheets of optically anisotropic members and the liquid crystal cells may be arranged from the polarizing plate at the incident side to the polarizing plate at the output side as follows: an optically anisotropic member—a liquid crystal cell—an optically anisotropic member; an optically anisotropic member—optically anisotropic member—a liquid crystal cell; or a liquid crystal cell—an optically anisotropic member—an optically anisotropic member.

In the liquid crystal display device of the present invention, when $$(\Sigma n_{xi} + \Sigma n_{yi})/2 > \Sigma n_{zi}$$

there is the possibility that the quality of the black depth is poor, and the contrast decreases when the display screen is viewed at an oblique angle. The contrast (CR) means a value expressed by (CR)=$Y_{ON}/Y_{OFF}$, wherein $Y_{OFF}$ represents the luminance during the dark display of a liquid crystal display device, and $Y_{ON}$ represents the luminance during the bright display of the liquid crystal display device. The greater the value of CR is, the better the visibility is. The bright display means the condition in which the brightness of the liquid crystal display is the highest. The dark display means the condition in which the brightness of the liquid crystal display is the lowest. In the present invention, the polar angle means the angle between the direction of the vision and the direction directly in front of the display when the face of the liquid crystal display is viewed.

In the liquid crystal display device of the present invention, when, in Optical laminate (O) formed by laminating k sheets of optically anisotropic members and liquid crystal cells, the retardation of light having a wavelength of 550 nm incident perpendicularly is represented by $R_0$, and the retardation of light having a wavelength of 550 nm incident at an angle inclined by 40 degrees with respect to the normal toward the major axis is represented by $R_{40}$, $$0.90 < R_{40}/R_0 < 1.10$$

preferably $$0.92 < R_{40}/R_0 < 1.08$$

and more preferably $$0.95 < R_{40}/R_0 < 1.05$$

It is preferable that the retardation of light having a wavelength of 550 nm incident at an angle inclined by 40 degrees with respect to the normal toward the major axis ($R_{40}$) is measured in the following two directions: the α-direction existing within the Y-Z plane and expressed as the polar angle using the slow axis of Optical laminate (O) as the axis of rotation, as shown in FIG. 1; and the β-direction existing within the X-Z plane and expressed as the polar angle using the fast axis of Optical laminate (O) as the axis of rotation. When the value of $R_{40}/R_0$ is smaller than 0.90 or exceeds 1.10 and the difference between the retardation of light having a wavelength of 550 nm incident perpendicularly ($R_0$) and the retardation of light having a wavelength of 550 nm incident at an angle inclined by 40 degrees with respect to a normal toward the major axis ($R_{40}$) is great, there is the possibility that the quality of the black depth is poor, and the contrast decreases when the display screen is viewed at oblique angles.

In the liquid crystal display device of the present invention, the polarizing plate at the output side comprises protective films disposed on both faces of the polarizer at the output side and a low refractive index layer which has a refractive index of 1.37 or smaller, comprises a cured coating film of a silicone comprising hollow fine particles or porous fine particles and is disposed at the side of observation of the face of the protective film at the side of observation of the polarizer at the output side. By disposing the low refractive index layer which has a refractive index of 1.37 or smaller, comprises a cured coating film of a silicone comprising hollow fine particles or porous fine particles and is disposed at the side of observation of the face of the protective film at the side of observation of the polarizer at the output side, the reflection on the surface of the protective film at the side of observation is prevented, and the visibility of the liquid crystal display device can be improved. It is preferable that the protective film has a hard coat layer in combination with the low refractive index layer. The low refractive index layer may be laminated to the face of the protective film directly or via the hard coat layer. When the refractive index of the low refractive index layer exceeds 1.37, there is the possibility that the antireflection property becomes insufficient.

In the present invention, it is preferable that the substrate of the protective film comprises a transparent resin. It is preferable that the transparent resin has a total light transmission of 80% or greater and more preferably 90% or greater as measured using a molded article having a thickness of 1 mm. Examples of the transparent resin include resins having an alicyclic structure, chain-form olefin-based resins such as polyethylene and polypropylene, cellulose-based resins, polycarbonate-based resins, polyester-based resins, polysulfone-based resins, polyether sulfone-based resins, polystyrene-based resins, polyvinyl alcohol-based resins and polymethacrylate-based resins. The resin may be used singly or in combination of two or more.

Among these resins, resins having an alicyclic structure such as norbornene-based polymers, polymers based on cyclic olefins having a single ring, cyclic conjugated diene-based polymers, vinyl alicyclic hydrocarbon polymers and hydrogenation products of these polymers; cellulose-based resins such as cellulose diacetate, cellulose triacetate and cellulose acetate butyrate; and polyester-based resins such as polyethylene terephthalate, polybutylene terephthalate and polyethylene naphthalate are preferable. Norbornene-based polymers, triacetyl-cellulose and polyethylene terephthalate are more preferable, and norbornene-based polymers are most preferable since the transparency, the small hygroscopicity, the dimensional stability and the light weight are excellent. Examples of the norbornene-based polymer include ring-opening polymers of norbornene-based monomers, ring-opening copolymers of norbornene-based monomers with other monomers and hydrogenation products of these polymers; and addition polymers of norbornene-based monomers, addition copolymers of norbornene-based monomers with other monomers and hydrogenation products these polymers. Among these polymers, hydrogenation products of ring-opening polymers of norbornene-based monomers are most preferable due to the excellent transparency.

It is preferable that the transparent resin has a weight-average molecular weight of 10,000 to 300,000, more preferably 15,000 to 250,000 and most preferably 20,000 to 200,000 as measured in accordance with the gel permeation chromatography using cyclohexane or toluene as the solvent and expressed as the corresponding value of polystyrene. The transparent resin having a weight-average molecular weight of 10,000 to 300,000 is advantageously used since the balance between the mechanical properties and the workability in molding of the substrate is excellent to a great degree.

The molecular weight distribution of the transparent resin is not particularly limited. It is preferable that the ratio of the weight-average molecular weight (Mw) to the number-average molecular weight (Mn) is 1 to 10, more preferably 1 to 6 and most preferably 1.1 to 4. The transparent resin having a ratio of the weight-average molecular weight (Mw) to the number-average molecular weight (Mn) of 1 to 10 is used advantageously since the balance between the mechanical properties and the workability in molding of the substrate is excellent to a great degree.

In the present invention, various compounding ingredients may be added to the transparent resin. Examples of the compounding ingredient include antioxidants such as phenol-based antioxidants, phosphoric acid-based antioxidants and sulfur-based antioxidants; ultraviolet light absorbents such as benzotriazole-based ultraviolet light absorbents, benzoate-based ultraviolet light absorbents, benzophenone-based ultraviolet light absorbents, acrylate-based ultraviolet light absorbents and metal complex-based ultraviolet light absorbents; light stabilizers such as hindered amine-based light stabilizers; coloring agents such as dyes and pigments; lubricants such as esters of aliphatic alcohols, esters of polyhydric alcohols, fatty acid amides and inorganic particles; plasticizers such as triester-based plasticizers, phthalic acid ester-based plasticizers, fatty acid-base acid ester-based plasticizers and oxyacid ester-based plasticizers; and antistatic agents such as fatty acid esters of polyhydric alcohols.

The protective film used in the present invention can be obtained by forming the above transparent resin into the film form in accordance with a conventional molding process and, where necessary, by stretching the obtained film. As the molding process, the molding by melt extrusion is preferable since the content of volatile components in the film and the fluctuation in the thickness can be decreased. Examples of the molding by melt extrusion include the process using a die such as a T-die and the inflation process. The process using a T-die is preferable due to the excellent productivity and accuracy of the thickness.

In the present invention, one or both faces of the protective film may be treated for the surface modification. Adhesion with a hard coat layer or the polarizer can be improved by the treatment for the surface modification. Examples of the treatment for the surface modification include the treatment by irradiation with an energy ray and the treatment with a chemical.

Examples of the treatment with an energy ray include the treatment by corona discharge, the treatment with plasma, the treatment by irradiation with electron beams and the treatment by irradiation with ultraviolet light. Among these treatments, the treatment by corona discharge and the treatment with plasma are preferable due the excellent efficiency of the treatment, and the treatment with corona discharge is more preferable. Examples of the treatment with a chemical include the process comprising dipping into an aqueous solution of an oxidizing agent such as an aqueous solution of potassium dichromate and concentrated sulfuric acid, followed by washing with water.

It is preferable that the thickness of the substrate of the protective film is 5 to 300 µm, more preferably 40 to 200 µm and most preferably 50 to 150 µm. When the thickness of the substrate of the protective film is 5 to 300 µm, the liquid crystal display device exhibiting excellent durability of the face of the display, mechanical strength, scratch resistance and optical properties can be obtained.

The hard coat layer is a layer having a great surface hardness. It is preferable that the hard coat layer has a hardness of HB or harder and more preferably H or harder as measured in accordance with the test of the pencil hardness described in Japanese Industrial Standard K 5600.

It is preferable that the hard coat layer has a refractive index of 1.50 or greater, more preferably 1.53 or greater and most preferably 1.55 or greater. When the refractive index of the hard coat layer is 1.50 or greater, reflection of light from the outside can be prevented, the excellent antireflection property is exhibited in a wide range of the wavelength such as the whole range of the visible light, the design of the low refractive index layer laminated to the hard coat layer is facilitated, and an optical laminate film having excellent scratch resistance can be obtained. The refractive index can be measured using, for example, a spectroscopic elipsometer.

It is preferable that the hard coat layer has an arithmetic average roughness Ra described in Japanese Industrial Standard B0601 of 35 nm or smaller and more preferably 1 to 30 nm. When the arithmetic average roughness is 35 nm or smaller, adhesion between the hard coat layer and the low refractive index layer is enhanced due to the anchor effect, and the balance between the antiglare property and the small reflectance can be improved. The average thickness of the hard coat layer is not particularly limited. In general, it is preferable that the thickness is 0.5 to 30 µm and more preferably 3 to 15 µm. The arithmetic average roughness Ra can be measured by observing the interference fringes under scanning at a constant speed using a microscope for the three-dimensional structural analysis [manufactured by ZYGO Company].

In the present invention, the material for forming the hard coat layer is not particularly limited. Examples of the material include organic hard coat materials such as silicone-based materials, melamine-based materials, epoxy-based materials, acrylic materials and urethane-acrylate-based materials; and inorganic hard coat materials such as silicon dioxide-based materials. Among these materials, the urethane-acrylate-based hard coat materials and polyfunctional acrylate-based hard coat materials are preferable due the great adhesive ability and the excellent productivity.

Preferable examples of the hard coat material include materials comprising resins of the active energy curing type and/or particles of inorganic oxides. The resin of the active energy curing type is a resin in which prepolymers, oligomers and/or monomers having a polymerizable unsaturated bond or epoxy group in the molecule are cured by irradiation with an active energy ray. To cure the prepolymer, the oligomer and/or the monomer by polymerization, a photopolymerization initiator or a photopolymerization accelerator may be added. The active energy ray is a ray having an energy quantum capable of polymerizing or crosslinking molecules among electromagnetic waves and charged particle rays. In general, ultraviolet light or electron beams are used.

The particles of an inorganic oxide are particles which can adjust the electric conductivity and the refractive index of the hard coat layer. It is preferable that the particles of inorganic oxides for increasing the refractive index have a refractive index of 1.6 or greater and more preferably 1.6 to 2.3. Examples of the particles of an inorganic oxide having a great refractive index include particles of titania (titanium oxide), zirconia (zirconium oxide), zinc oxide, tin oxide, cerium oxide, antimony pentaoxide, indium oxide doped with tin (ITO), tin oxide doped with antimony (ATO), tin oxide doped with phosphorus (PTO), indium oxide doped with zinc (IZO), zinc oxide doped with aluminum (AZO) and tin oxide doped with fluorine (FTO). Among these oxides, antimony pentaoxide, tin oxide doped with phosphorus and titanium oxide are preferable as the component for adjusting the refractive index due to the great refractive index and the excellent balance between the electric conductivity and the transparency.

It is preferable that the particles of an inorganic oxide have a diameter of primary particles of 1 to 100 nm and more preferably 1 to 50 nm so that the transparency of the hard coat layer is not decreased. The diameter of the primary particle of the particles of an inorganic oxide can be measured by visual observation of an image picture of discharge of secondary electrons obtained by a scanning electron microscope (SEM) or by mechanical measurement using a meter for measuring the distribution of the particle diameter utilizing the dynamic light scattering method or the static light scattering method.

It is preferable that at least a portion of the surface of the particles of an inorganic oxide is covered with an organic compound or an organometallic compound having an anionic polar group. The particles of an inorganic oxide can be used singly or in combination of two or more types. By the combined use of two or more type of particles of inorganic oxides, a hard coat layer exhibiting an excellent balance between plurality of functions can be formed. For example, when particles of titanium oxide of the rutile type having a great refractive index and a small electric conductivity and an electrically conductive inorganic oxide having a very great electric conductivity and a refractive index smaller than that of titanium oxide of the rutile type are used in combination, a hard coat layer simultaneously exhibiting the prescribed refractive index and the excellent antistatic property can be formed. It is preferable that the amount of the particles of an inorganic oxide is 200 to 1,200 parts by weight and more preferably 300 to 800 parts by weight per 100 parts by weight of the active energy ray curable resin.

In the present invention, the hard coat layer may comprise a leveling agent so that the particles of an inorganic oxide is uniformly dispersed in the hard coat layer. As the leveling agent, fluorine-based surfactants are preferable, and nonionic fluorine-based surfactants comprising an oligomer having a fluoroalkyl group are more preferable. The hard coat layer may further comprise a silicon compound reactive to organic compounds.

The hard coat layer can be formed, in general, by coating the transparent substrate with a fluid in which the active energy ray curable resin, the particles of an inorganic oxide and oligomers having a fluoroalkyl group which are used where necessary are dissolved or dispersed, followed by drying the formed layer to obtain a coating film and then curing the coating film by irradiation with an active energy ray. Examples of the process for the coating include the wire bar coating process, the dipping process, the spraying process, the spin coating process, the roll coating process and the gravure coating process. The intensity and the time for the irradiation with the active energy ray are not particularly limited. The conditions of the irradiation such as the intensity of the irradiation and the time of the irradiation can be set in accordance with the used resin of the active energy ray curable resin.

In the liquid crystal display device of the present invention, it is preferable that the low refractive index layer is a cured film of a coating material composition comprising hollow fine particles or porous fine particles, at least one of a hydrolyzate shown in (A) in the following (occasionally, referred to as Hydrolyzate (A), hereinafter) and a copolymer hydrolyzate shown in (B) in the following (occasionally, referred to as Copolymer hydrolyzate (B), hereinafter) and a hydrolyzable organosilane shown in (C) in the following (occasionally, referred to as Hydrolyzable organosilane (C), hereinafter):
(A) A hydrolyzate obtained by hydrolysis of a hydrolyzable organosilane represented by general formula [1]:

$SiX_4$ [1]

wherein X represents a hydrolyzable group;
(B) A copolymer hydrolyzate obtained by hydrolysis of a copolymer of a hydrolyzable organosilane represented by general formula [1] and a hydrolyzable organosilane having an alkyl group substituted with fluorine atom; and
(C) A hydrolyzable organosilane having a water-repelling group at a linear chain portion and two or more silicon atoms having a bonded alkoxyl group in a molecule.

In the present invention, Hydrolyzate (A) is a four-functional silicone resin obtained by hydrolysis of a four-functional hydrolyzable organosilane represented by general formula [1]. Examples of the four-functional hydrolyzable organosilane represented by general formula [1] include four-functional organoalkoxysilanes represented by general formula [5]:

$Si(OR)_4$ [5]

In general formula [5], R represents a monovalent hydrocarbon group and more preferably a monovalent hydrocarbon group having 1 to 8 carbon atoms. The hydrocarbon group may be a linear group or a branched group. Examples of the hydrocarbon group include methyl group, ethyl group, propyl group, isopropyl group, butyl group, isobutyl group, t-butyl group, pentyl group, hexyl group, heptyl group and octyl group.

Examples of the hydrolyzable group in the four-functional hydrolyzable organosilane represented by general formula [1] include the alkoxyl groups described above, acetoxy group, oxime groups (—O—N=C—R(R')), enoxy groups (—O—C(R)=C(R')(R'')), amino group, aminoxy groups (—O—N(R)R'), amido groups (—N(R)—C(C=O)—R') and halogen atoms. In the above chemical formulae, R, R' and R'' each independently represent hydrogen atom or a monovalent hydrocarbon group. As the hydrolyzable group represented by X, alkoxyl groups are preferable.

The preparation of Hydrolyzate (A) which is a four-functional silicone resin can be conducted by complete or partial hydrolysis of a four-functional hydrolyzable organosilane such as the four-functional organoalkoxysilane described above. The molecular weight of Hydrolyzate (A) which is the four-functional silicone resin obtained above is not particularly limited. It is preferable that the weight-average molecular weight is 200 to 2,000 so that the sufficient mechanical strength of the cured coating film is obtained with the material for forming a matrix in a smaller amount based on the amount of the hollow fine particles such as hollow fine particles of silica. When the weight-average molecular weight is smaller than 200, there is the possibility that the property for forming the coating film is poor. When the weight-average molecular weight exceeds 2,000, there is the possibility that the mechanical properties of the cured coating film are poor.

As the silicone resin described above, a partial hydrolyzate and/or a complete hydrolyzate obtained by hydrolysis of the tetraalkoxysilane represented by general formula [5] in the presence of water in an amount such that the ratio of the amounts by mole [$H_2O$]/[OR] is 1.0 or greater, for example, 1.0 to 5.0 and preferably 1.0 to 3.0, preferably in the presence of an acid catalyst or a base catalyst, can be used. In particular, the partial hydrolyzate and/or the complete hydrolyzate obtained by hydrolysis in the presence of an acid catalyst tends to form a two-dimensionally crosslinked structure, and porosity of the dried coating film tends to increase. When the ratio of the amounts by mole [$H_2O$]/[OR] is smaller than 1.0, there is the possibility that the amount of the unreacted alkoxyl group increases, and adverse effects such as an excessively great refractive index of the coating film are exhibited. When the ratio of the amounts by mole [$H_2O$]/[OR] exceeds 5.0, there is the possibility that the condensation proceeds extremely rapidly, and gelation of the coating composition takes place. The hydrolysis may be conducted under any desired suitable conditions. For example, the hydrolysis can be conducted by mixing the materials under stirring at a temperature of 5 to 30° C. for 10 minutes to 2 hours. To adjust the weight-average molecular weight at 2,000 or greater and obtain a smaller refractive index of the matrix itself, the desired silicone resin can be obtained by allowing the reaction in the obtained hydrolyzate to proceed, for example, at 40 to 100° C. for 2 to 10 hours.

Copolymer hydrolyzate (B) used in the present invention is a hydrolyzate of a copolymer of a hydrolyzable organosilane and a hydrolyzable organosilane having an alkyl group substituted with fluorine atom. Examples of the hydrolyzable organosilane include four-functional hydrolyzable organosilanes represented by general formula [1]. Examples of the four-functional hydrolyzable organosilane include the four-functional organoalkoxysilanes represented by general formula [5].

As the hydrolyzable organosilane having an alkyl group substituted with fluorine atom, organosilanes having a constituting unit represented by general formula [6], general formula [7] or general formula [8] are preferable:

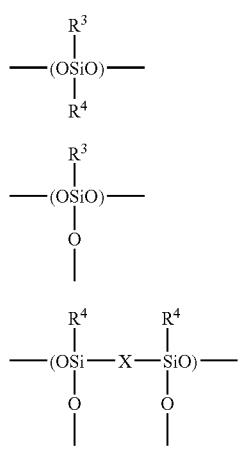

In general formulae [6] to [8], $R^3$ represents a fluoroalkyl group or perfluoroalkyl group having 1 to 16 carbon atoms. $R^4$ represents an alkyl group or a halogenated alkyl group having 1 to 16 carbon atoms, an aryl group, an alkylaryl group, an arylalkyl group, an alkenyl group, an alkoxyl group, hydrogen atom or a halogen atom. X represents —($C_aH_bF_c$)—, wherein a represents an integer of 1 to 12, b+c=2a, b represents an integer of 0 to 24, and c represents an integer of 0 to 24. As the group represented by X, groups having a fluoroalkylene group and an alkylene group are preferable.

Copolymer hydrolyzate (B) can be obtained by mixing the hydrolyzable organosilane and the hydrolyzable organosilane having an alkyl group substituted with fluorine atom, followed by copolymerization with hydrolysis. The ratio of the amount of the hydrolyzable organosilane to the amount of the hydrolyzable organosilane having an alkyl group substituted with fluorine atom in the copolymerization is not particularly limited. It is preferable that the ratio of the amount of the hydrolyzable organosilane to the amount of the hydrolyzable organosilane having an alkyl group substituted with fluorine atom is 99/1 to 50/50 expressed as the ratio of the amounts by weight in the condensed compound. The weight-average molecular weight of the copolymer hydrolyzate is not particularly limited. It is preferable that the weight-average molecular weight is 200 to 5,000. When the weight-average molecular weight is smaller than 20, there is the possibility that the ability for forming a coating film is poor. When the weight-average molecular weight exceeds 5,000, there is the possibility that the strength of the coating film decreases.

Hydrolyzable organosilane (C) used in the present invention is a compound having a water-repelling (hydrophobic) linear chain portion and two or more silicon atoms having a bonded alkoxyl group in the molecule. It is preferable that the silicone alkoxide is bonded at least to both end portions of the linear chain portion. It is sufficient that Hydrolyzable organosilane (C) has two or more silicone alkoxide, and there is no upper limit to the number of the silicone alkoxide.

As Hydrolyzable organosilane (C), any of compounds in which the linear chain portion has a dialkylsiloxy-based structure and compounds in which the linear chain portion has a fluorine-based structure may be used.

The linear chain portion of Hydrolyzable organosilane (C) having the dialkoxysiloxy-based structure has the structure represented by general formula [2], and it is preferable that the length of the linear chain portion represented by n is 2 to 200.

When n represents a number smaller than 2, i.e., 1, the water-repelling property of the linear chain portion is insufficient, and there is the possibility that the effect of the presence of Hydrolyzable organosilane (C) is not sufficiently exhibited. When n represents a number exceeding 200, the compatibility with other materials for forming a matrix tends to become poor, and there is the possibility that the transparency of the cured coating film is adversely affected, and unevenness arises in the appearance of the cured coating film.

As Hydrolyzable organosilane (C) having the dialkylsiloxy-based structure, compounds represented by general formulae [9], [11] and [12] can be used:

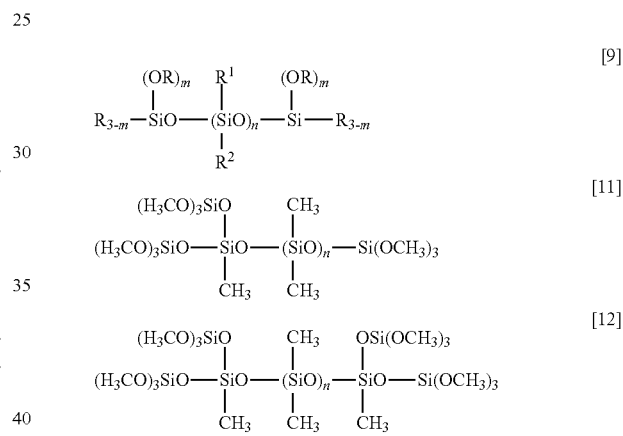

In general formula [9], $R^1$ and $R^2$ represent alkyl groups, m represents an integer of 1 to 3, and n represents an integer of 2 to 200. In general formulae [11] and [12], n represents an integer of 2 to 200.

Examples of the compound represented by general formula [9] include compounds represented by general formula [10]:

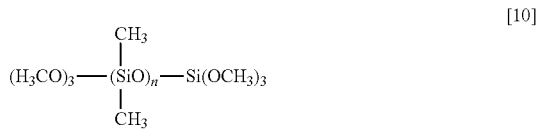

The linear chain portion of Hydrolyzable organosilane (C) based on fluorine is formed as shown by general formula [3], and it is preferable that the length of the linear chain portion represented by m is 2 to 20.

$$—(CF_2)_m—\quad [3]$$

When m represents a number smaller than 2, i.e., 1, the water-repelling property of the linear chain portion is insufficient, and there is the possibility that the effect of the presence of Hydrolyzable organosilane (C) is not sufficiently exhibited. When m represents a number exceeding 20, the compatibility with other materials for forming a matrix tends to become poor, and there is the possibility that the transparency of the cured coating film is adversely affected, and unevenness arises in the appearance of the cured coating film.

Examples of Hydrolyzable organosilane (C) based on fluorine include compounds represented by general formulae [13] to [16]:

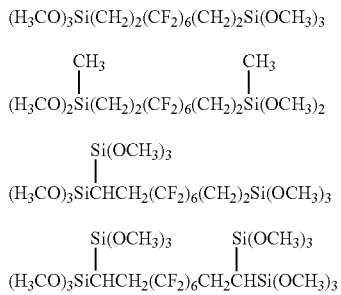

Among the above compounds, Hydrolyzable organosilane (C) in which three or more silicon atoms having an alkoxyl group are bonded to the linear chain portion such as the compounds represented by general formulae [15] and [16] are preferable. When the compound has three or more silicon atoms having a bonded alkoxyl group as described above, the water-repelling linear chain portion is strongly bonded to the surface of the coating film, and the effect of making the surface of the cured coating film water-repelling can be enhanced.

The material for forming a matrix can be formed when the material comprises at least one of Hydrolyzate (A) and Copolymer hydrolyzate (B) in combination with Hydrolyzable organosilane (C). In the material for forming a matrix, the ratio of the amount of at least one of Hydrolyzate (A) and Copolymer hydrolyzate (B) to the amount of Hydrolyzable organosilane (C) is not particularly limited. It is preferable that (at least one of (A) and (B)/(C)) is 99/1 to 50/50 expressed as the ratio of the amounts by weight of the corresponding components in the condensed product.

In the present invention, it is preferable that the coating film formed on the surface of the transparent substrate is subjected to a heat treatment after being dried. The mechanical strength of the cured coating film can be increased by the heat treatment. It is preferable that the heat treatment is conducted at 80 to 150° C. for 1 to 10 minutes. Since the heat treatment can be conducted at a low temperature for a short time, the type of the substrate is not restricted unlike the cases in which a heat treatment at a high temperature for long time is required. The material for forming a matrix comprises Hydrolyzable organosilane (C). Two or more silicon atoms having bonded alkoxides in Hydrolyzable organosilane (C) are coordinated at the surface of the coating film, and the water-repelling groups are bonded to the surface of the coating film in a bridge form. Therefore, the surface of the cured coating film is made water-repelling and denser, and pores of the porous substance are made smaller Therefore, invasion of water into the inside of the cured coating film can be suppressed even when the heat treatment is conducted at a low temperature, and the increase in the refractive index of the film and the decreased in the antireflection property due to the invasion of water can be prevented.

In the liquid crystal display device of the present invention, it is preferable that the low refractive index layer is a cured coating film of a coating material composition comprising hollow fine particles or porous fine particles, at least one of a hydrolyzate shown in (A) in the following (occasionally, referred to as Hydrolyzate (A), hereinafter) and a copolymer hydrolyzate shown in (B) in the following (occasionally, referred to as Copolymer hydrolyzate (B), hereinafter) and a siliconediol shown in (D) in the following (occasionally, referred to as Siliconediol (D), hereinafter).

(A) A hydrolyzate obtained by hydrolysis of a hydrolyzable organosilane represented by general formula [1]:

$$SiX_4 \quad [1]$$

wherein X represents a hydrolyzable group.

(B) A copolymer hydrolyzate obtained by hydrolysis of a copolymer of a hydrolyzable organosilane represented by general formula [1] and a hydrolyzable organosilane having an alkyl group substituted with fluorine atom.

(D) A siliconediol of the dimethyl type represented by general formula [4]:

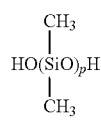

wherein p represents an integer of 20 to 100.

Hydrolyzate (A) of hydrolyzable organosilane and Copolymer hydrolyzate (B) which is a hydrolyzate of a hydrolyzable organosilane and a hydrolyzable organosilane having an alkyl group substituted with fluorine atom are the same as those described above.

When the coating material composition comprises Siliconediol (D) as a component of the material for forming a matrix, the friction coefficient at the surface of the cured coating film can be decreased. Slipping at the surface of the cured coating film is facilitated to suppress damages due to scratches, and the scratch resistance can be improved. The siliconediol of the dimethyl type used in the present invention is localized on the surface of the coating film after the coating film is formed, and the transparency of the coating film is not adversely affected. Since the siliconediol of the dimethyl type exhibits excellent compatibility with the material for forming a matrix and has the reactivity with silanol group in the material for forming a matrix, the siliconediol of the dimethyl type is fixed to the surface of the cured coating film as a portion of the matrix. Therefore, the siliconediol of the dimethyl type is not removed by wiping the surface of the cured coating film unlike the case in which a silicone oil having methyl group at both end portions is mixed. The friction coefficient of the surface of the cured coating film can be kept at a small value for a long time, and the scratch resistance can be maintained for a long time.

Siliconediol (D) used in the present invention is a siliconediol of the dimethyl type represented by general formula [4]. In general formula [4], it is preferable that the number of repeating of the dimethylsiloxane unit represented by p is 20 to 100. When the number represented by p is smaller than 20, there is the possibility that the effect of decreasing the friction coefficient is not sufficiently exhibited. When the number represented by p exceeds 100, there is the possibility that the compatibility with other components in the materials for forming a matrix becomes poor to decrease the transparency of the cured coating film, and unevenness arises in the appearance of the cured coating film. The material for forming a matrix comprises at least one of Hydrolyzate (A) and Copolymer hydrolyzate (B) and Siliconediol (D). It is preferable that the content of Silicondiol (D) is 1 to 10% by weight based on the entire amount of the solid components in the coating material composition.

In the liquid crystal display device of the present invention, it is preferable that the low refractive index layer is a cured coating film of a coating material composition which comprises a re-hydrolyzate obtained by hydrolysis of a hydrolyzate shown in (A) in the following (occasionally, referred to as Hydrolyzate (A), hereinafter) in the condition such that the Hydrolyzate A is mixed with hollow fine particles or porous fine particles and a copolymer hydrolyzate shown in (B) in the following (occasionally, referred to as Copolymer hydrolyzate (B), hereinafter):
(A) A hydrolyzate obtained by hydrolysis of a hydrolyzable organosilane represented by general formula [1]:

$$SiX_4 \qquad [1]$$

wherein X represents a hydrolyzable group;
(B) A copolymer hydrolyzate obtained by hydrolysis of a copolymer of a hydrolyzable organosilane represented by general formula [1] and a hydrolyzable organosilane having an alkyl group substituted with fluorine atom.

Hydrolyzate (A) and copolymer hydrolyzate (B) which is a hydrolyzate of a copolymer of a hydrolyzable organosilane and a hydrolyzable organosilane having an alkyl group substituted with fluorine atom are the same as those described above.

When Hydrolyzate (A) is prepared by hydrolysis of the hydrolyzable organosilane, in the present invention, Hydrolyzate (A) can be further hydrolyzed in the condition such that hollow fine particles or porous fine particles have been mixed, and Hydrolyzate (A) can be formed into a re-hydrolyzate in which the hollow fine particles or the porous fine particles are mixed. In the formed re-hydrolyzate, Hydrolyzate (A) reacts with the surface of the hollow fine particles or the porous fine particles during the decomposition to chemically bond Hydrolyzate (A) to the hollow fine particles or the porous fine particles, and the affinity of Hydrolyzate (A) with the hollow fine particles or the porous fine particles can be enhanced. It is preferable that the hydrolysis in the condition such that the hollow fine particles or the porous fine particles have been mixed is conducted at 20 to 30° C. When the reaction temperature is lower than 20° C., the reaction does not proceed sufficiently, and there is the possibility that the effect of enhancing the affinity is not sufficiently exhibited. When the reaction temperature exceeds 30° C., there is the possibility that the reaction proceeds excessively rapidly to make it difficult that the prescribed molecular weight is surely obtained, and the molecular weight becomes excessively great to decrease the strength of the film.

As described above, the re-hydrolyzate can be obtained by preparing Hydrolyzate (A) by hydrolysis of the hydrolyzable organosilane, followed by further hydrolysis of Hydrolyzate (A) in the condition such that the hollow fine particles or the porous fine particles have been mixed. Alternately, the preparation of the re-hydrolyzate comprising the hollow fine particles or the porous fine particles may be conducted simultaneously with the preparation of Hydrolyzate (A) by hydrolyzing the hydrolyzable organosilane in the condition such that the hollow fine particles or the porous fine particles have been mixed.

The coating material composition comprising a mixture of the re-hydrolyzate derived from Hydrolyzate (A) and Copolymer hydrolyzate (B) as the material for forming a matrix and the hollow fine particles or the porous fine particles as the filler can be obtained by mixing the re-hydrolyzate containing the mixed hollow fine particles or porous fine particles with Copolymer hydrolyzate (B). It is preferable that the ratio of the amounts by weight of the re-hydrolyzate derived from Hydrolyzate (A) and comprising the hollow fine particles or the porous fine particles to copolymer hydrolyzate (B) is 50/50 to 99/1. When the relative amount of copolymer hydrolyzate (B) is less than 1%, there is the possibility that the water-repelling property, the oil-repelling property and the antifouling property are not sufficiently exhibited. When the relative amount of copolymer hydrolyzate (B) exceeds 50%, there is the possibility that the effect of placing copolymer hydrolyzate (B) above the re-hydrolyzate is not exhibited significantly, and the product does not show the difference from a coating material composition obtained by simply mixing Hydrolyzate (A) and Copolymer hydrolyzate (B).

In the present invention, it is preferable that the affinity of Hydrolyzate (A) to the hollow fine particles or the porous fine particles are enhanced by Hydrolyzing hydrolyzate (A) in the condition such that the hollow fine particles or the porous fine particles have been mixed, and the coating material composition is prepared by mixing Copolymer hydrolyzate (B) thereafter. When the coating material composition is applied to the surface of a substrate to form the coating film, there is the tendency that Copolymer hydrolyzate (B) is localized at the surface layer of the coating film in the condition such that Copolymer hydrolyzate (B) is placed above the surface layer. The reason why Copolymer hydrolyzate (B) is localized at the surface layer of the coating film is not clear yet. It is supposed that, although Hydrolyzate (A) is present uniformly in the coating film due to the good affinity with the hollow fine particles or the porous fine particles, Copolymer hydrolyzate (B) having no affinity with the hollow fine particles or the porous fine particles is separated from the hollow fine particles or the porous fine particles and placed above the surface of the coating film. In particular, when the substrate has a small affinity with Copolymer hydrolyzate (B), Copolymer hydrolyzate (B) tends to be localized at the surface layer of the coating film separated from the substrate, and the above tendency is enhanced. As described above, when the cured coating film is formed in the condition such that Copolymer hydrolyzate (B) is localized at the surface layer, the fluorine component comprised in Copolymer hydrolyzate (B) is localized at the surface layer of the coating film. The localization of the fluorine component can enhance the water-repelling property and the oil-repelling property, and the antifouling property of the surface of the coating film can be improved.

In the present invention, hollow fine particles of silica can be used as the hollow fine particles or the porous fine particles. In the hollow silica fine particles, hollows are formed at the inside of an outer shell. Examples of the hollow silica fine particles include hollow fine particles of silica having hollows at the inside of an outer shell comprising a silica-based inorganic compound. Examples of the outer shell of a silica-based inorganic compound include a single layer of silica, a single layer of a composite oxide comprising silica and inorganic oxides other than silica and a double layer comprising a single layer of silica and a single layer of the composite oxide. The outer shell may be an open shell having pores or a closed shell in which pores are closed and hollows are sealed. It is preferable that the outer shell is a silica-based coating layer having a plurality of layers comprising the first silica coating layer at the inside and the second silica coating layer at the outside. By forming the second silica-based coating layer at the outside, fine pores in the outer shell are closed to make the shell denser, and hollow fine particles of silica in which the inner hollows are sealed with the outer shell can be obtained.

It is preferable that the thickness of the first coating layer is 1 to 50 nm and more preferably 5 to 20 nm. When the thickness of the first coating layer is smaller than 1 nm, there is the possibility that it become difficult that the shape of the particle is maintained, and the hollow silica fine particles are not obtained. Moreover, there is the possibility that partial hydrolyzate of the organosilicon compound penetrate into the pores of the nuclear particles when the second silica coating layer is formed, and removal of the component constituting the nuclear particles becomes difficult. When the thickness of the first silica coating layer exceeds 50 nm, there is the possibility that the relative amount of the hollow in the hollow fine particles of silica decreases, and the decrease in the refractive index becomes insufficient. It is preferable that the thickness of the outer shell is 1/50 to 1/5 of the average diameter of the particles. The thickness of the second silica coating layer can be selected in a manner such that the sum of the thickness of the second coating layer of silica and the first coating layer of silica is 1 to 50 nm. It is preferable that the sum of the thicknesses is 20 to 49 nm so that the outer shell is made denser.

In the hollows of the hollow fine particles, the solvent used during the preparation of the hollow fine particles of silica and/or gases invaded during the drying are present. In the hollows, the precursor substance for forming the hollows may be left remaining. The precursor substance left remaining may be attached to the outer shell in a small amount or may occupy a major portion of the hollows. The precursor substance is a porous substance left remaining after a portion of components of nuclear particles for forming the first silica coating layer has been removed from the nuclear particles. As the nuclear particles, porous particles of composite oxides comprising silica and inorganic oxides other than silica can be used. Examples of the inorganic oxide include $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, $TiO_2$—$Al_2O_3$ and $TiO_2$—$ZrO_2$. The solvent or the gases are present in the pores in the above porous substances. When the amount of the removed components is increased, the volume of the pores are increased, and hollow fine particles of silica having a small refractive index can be obtained. The transparent coating film obtained by mixing the obtained hollow fine particles of silica has a small refractive index and exhibits the excellent antireflection property.

The coating material composition used in the present invention can be prepared by mixing the material for forming a matrix with the hollow fine particles or the porous fine particles which are described above. In the coating material composition, it is preferable that the ratio of the amounts by weight of the hollow fine particles or the porous fine particles to other components is such that the hollow fine particles or the porous fine particles/other components (solid components) is 25/75 to 90/10 and more preferably 35/65 to 75/25. When the amount of the hollow fine particles or the porous fine particles is smaller than 25/75, there is the possibility that the effect of exhibiting a small refractive index of the cured coating film decreases. When the amount of the hollow fine particles or the porous fine particles exceeds 90/10, there is the possibility that the mechanical strength of the cured coating film obtained from the coating material composition decreases.

In the present invention, silica particles in which the inside of the outer shell is not hollow may be added to the coating material composition. By adding the silica particles in which the inside of the outer shell is not hollow, the mechanical strength of the cured coating film obtained from the coating material composition can be increased, and the smoothness of the surface and the crack resistance can be also improved. The form of the silica particles in which the inside of the outer shell is not hollow is not particularly limited. Examples of the form include the powder form and the sol form. When the silica particles are in the sol form, i.e., when the silica particles are used as colloidal silica, the silica particles can be used as colloidal silica dispersed in water or colloidal silica dispersed in a hydrophilic organic solvent such as an alcohol. In general, the colloidal silica has a content of silica of 20 to 50% by weight as the content of the solid components, and the amount of silica used for the mixing can be decided based on this content. It is preferable that the amount of silica particles added to the coating material composition is 0.1 to 30% by weight based on the amount of the entire solid components. When the amount of the silica particles is less than 0.1% by weight based on the amount of the entire solid components, there is the possibility that the effect of improving the mechanical strength, the smoothness of the surface and the crack resistance is not sufficiently exhibited. When the amount of the silica particles exceeds 30% by weight based on the amount of the entire solid components, there is the possibility that an adverse effect of increasing the refractive index of the cured coating film is exhibited.

In the liquid crystal display device of the present invention, at least one of porous particles which are obtained by polymerization with hydrolysis of a mixture obtained by mixing an alkoxysilane with a solvent, water and a catalyst for polymerization with hydrolysis, followed by removal of the solvent and porous particles having an average diameter of particles of aggregation of 10 to 100 nm which are obtained by polymerization with hydrolysis of a mixture obtained by mixing an alkoxysilane with a solvent, water and a catalyst for polymerization with hydrolysis, followed by termination of the polymerization before the formation of a gel to obtain a stabilized organosilica sol and removing the solvent from the organosilica sol may be used in place of the hollow fine particles or in combination with the hollow particles.

The porous particles used in the present invention can be obtained by polymerization with hydrolysis of a mixture obtained by mixing an alkoxysilane with a solvent, water and a catalyst for polymerization with hydrolysis, followed by removing the solvent by drying. As the process for the drying, supercritical drying is preferable. A gel-form substance having the skeleton structure of silica in the wet condition which is obtained by the hydrolysis and polymerization is dispersed in a dispersant such as an alcohol and carbon dioxide and dried under the supercritical condition at or above the critical point of the dispersion medium. The supercritical drying can be conducted, for example, as follows: a gel-form substance is dipped into liquefied carbon dioxide, the entire amount or a portion of the solvent contained in the gel-form substance is replaced with liquefied carbon dioxide having a critical point lower than the solvent, and the drying is conducted under the supercritical condition of a system comprising carbon dioxide alone or a mixed system comprising carbon dioxide and other solvent.

In the preparation of the porous particles, it is preferable that the porous particles are provided with the hydrophobic property by the hydrophobic treatment of the gel-form substance obtained by polymerization with hydrolysis of an alkoxysilane. The porous particles provided with the hydrophobic property suppresses invasion of moisture and water and can prevent degradation in the properties such as the refractive index and the light transmission. The hydrophobic treatment can be conducted before or during the supercritical drying of the gel-form substance.

The hydrophobic treatment can be conducted by bringing hydroxyl group in silanol group present on the surface of the gel-form substance into reaction with the functional group of the agent for the hydrophobic treatment to replace silanol group with the hydrophobic group in the agent for the hydrophobic treatment. As the procedure for the hydrophobic treatment, for example, the gel-form substance is dipped into a solution obtained by dissolving the agent for the hydrophobic treatment into a solvent and, after the agent for the hydrophobic treatment is allowed to penetrate into the gel-form substance by mixing or by other means, the reaction for the hydrophobic treatment is allowed to proceed, where necessary, under heating. Examples of the solvent used for the hydrophobic treatment include methanol, ethanol, isopropyl alcohol, benzene, toluene, xylene, N,N-dimethylformamide and hexamethyl-disiloxane. The solvent for the hydrophobic treatment is not particularly limited, and any solvent can be used as long as the agent for the hydrophobic treatment can be easily dissolved and can replace the solvent contained in the gel-form substance before the hydrophobic treatment.

When the supercritical drying is conducted as the step after the hydrophobic treatment, a medium in which the supercritical drying can be easily conducted such as methanol, ethanol, isopropyl alcohol and liquid carbon dioxide or which can be replaced with the above solvent is preferable as the solvent used for the hydrophobic treatment. Examples of the agent for the hydrophobic treatment include hexamethyldisilazane, hexamethyldisiloxane, trimethylmethoxysilane, dimethyldimethoxysilane, methyltrimethoxysilane, ethyltrimethoxysilane, trimethylethoxysilane, dimethyldiethoxysilane and methyltriethoxysilane.

The porous particles can be obtained by pulverizing a dried bulk material of the porous particles. However, when the coating film is formed as the antireflection film as is the case in the present invention, the cured coating film having a thickness as small as about 100 nm is formed, and it is necessary that the porous particles be fine particles having a diameter of about 50 nm. It is difficult that the porous particles are obtained as fine particles having a diameter of about 50 nm by pulverization when a bulk material is pulverized. When the diameter of the porous particles is great, it becomes difficult that the cured coating film is formed with a uniform thickness, and the surface roughness of the cured coating film is made small.

In this case, it is preferable that the porous particles in the fine particle form are prepared as described in the following. An organosilica sol is prepared by mixing an alkoxysilane with a solvent, water and a catalyst for polymerization with hydrolysis, followed by polymerization with hydrolysis. Examples of the solvent include an alcohol such as methanol. Examples of the catalyst for polymerization with hydrolysis include ammonia. Then, the polymerization is terminated before the formation of a gel by diluting the organosol with the solvent or by adjusting pH of the organosilica sol so that the growth of the polymer particles of silica is suppressed, and the organosilica sol can be stabilized.

As the process for stabilizing the organosilica sol by dilution, for example, it is preferable that the organosilica sol is diluted to a volume at least twice the original volume using a solvent in which the organosilica sol prepared in the first step is easily dissolved such as ethanol, isopropyl alcohol and acetone. When the solvent contained in the organosilica sol prepared in the first step is an alcohol and an alcohol is used also for the dilution, it is preferable that the dilution is conducted using an alcohol having a greater number of carbon atoms than that of the alcohol contained in the organosilica sol prepared in the first step. The reason is that a great effect of suppressing the polymerization with hydrolysis is exhibited during the dilution due to the substitution reaction of the alcohol contained in the silica sol.

As the process for stabilizing the organosilica sol by adjusting pH, for example, pH of the organosilica sol is adjusted at a slightly acidic condition by adding an acid when the catalyst for polymerization with hydrolysis in the preparation of the organosilica sol in the first step is alkaline or by adding an alkali when the catalyst for polymerization with hydrolysis in the preparation of the organosilica sol in the first step is acidic. As the slightly acidic condition, a pH of about 3 to 4 is preferable although it is necessary that a stable pH be selected in accordance with the type of the solvent used for the preparation and the amount of water. For example, it is preferable that pH is adjusted at 3 to 4 by adding sulfuric acid or hydrochloric acid to the organosilica sol prepared by selecting ammonia as the catalyst for polymerization with hydrolysis, and by adding a weak alkali such as ammonia and sodium hydrogencarbonate to the organosilica sol prepared by selecting nitric acid as the catalyst for polymerization with hydrolysis.

Although any of the dilution and the adjustment of pH can be selected as the process for stabilizing the organosilica sol, it is more effective that the dilution and the adjustment of pH are used in combination. The polymerization with hydrolysis can be further suppressed by conducting the hydrophobic treatment of fine particles of silica aerogel by adding an organosilane compound such as hexamethyl-disilazane and trimethylchlorosilane in the above treatment.

Fine porous particles of silica aerogel can be obtained by directly drying the above organosilica sol. It is preferable that the fine porous particles of silica aerogel has an average diameter of aggregated particles of 10 to 100 nm. When the average diameter of aggregated particles is smaller than 10 nm, there is the possibility that the material for forming a matrix invades into the particles of silica aerogel during the preparation of the coating material composition by mixing with the material for forming a matrix, and the particles of silica aerogel are not porous any more in the dried coating film. When the average diameter of aggregated particles exceeds 100 nm, there is the possibility that it is difficult that the cured coating film is obtained with a uniform thickness, and the decrease in the surface roughness become difficult.

As for the process for drying the organosilica sol, for example, after the organosilica sol is packed into a pressure-resistant vessel and the solvent in the silica sol is replaced with liquefied carbon dioxide, the condition is adjusted at a temperature of 32° C. or higher and a pressure of 8 MPa or greater and, then, the pressure is reduced. In this manner, the organosilica gel is dried, and the particles of silica aerogel can be obtained. As the process for suppressing the growth by polymerization of the organosilica sol other than the dilution and the adjustment of pH described above, the polymerization of silica particles can be terminated by adding an organosilane compound such as hexamethylsilazane and trimethylchlorosilane. In accordance with this process, the particles of silica gel can be made hydrophobic with the organosilane compound at the same time.

In the present invention, when the coating film is formed as the antireflection film, it is preferable that the coating film exhibits excellent transparency with clear feel, and it is more preferable that the haze value is 0.2% or smaller. For this purpose, it is preferable that, in the preparation of the coating material composition by adding the particles of silica gel to the material for forming a matrix, the particles of silica gel is uniformly dispersed in the solvent before being added to the material for forming a matrix. The alkoxysilane is mixed with a solvent such as methanol, water and an alkaline catalyst for polymerization with hydrolysis such as ammonia, and the organosilica sol is prepared by polymerization with hydrolysis. Then, the growth of the polymer particles of silica is suppressed by diluting the organosilica sol with a solvent or by adjusting pH of the organosilica sol before the formation of a gel, and the organosilica sol is stabilized. The coating material composition can be prepared by adding the stabilized organosilica sol used as the dispersion of silica aerogel to the material for forming a matrix.

It is preferable that the average diameter of aggregated particles of silica aerogel in the organosilica sol is 10 to 100 nm. When the average diameter of aggregated particles is smaller than 10 nm, there is the possibility that the material for forming a matrix invades into the particles of silica aerogel during the mixing with the material for forming a matrix for the preparation of the coating material composition, and the particles of silica aerogel are not porous any more in the dried coating film. When the average diameter of aggregated particles is adjusted at 10 nm or greater, the invasion of the material for forming a matrix into the particles of silica aerogel can be prevented. When the average diameter of aggregated particles exceeds 100 nm, there is the possibility that it is difficult that the cured coating film is formed with a uniform thickness, and the decrease in the surface roughness become difficult.

The solvent is removed by the drying in the formation of the coating film by application of the coating material composition, and the porous particles of silica aerogel are formed. In the coating material composition used in the present invention, it is preferable that the content of the porous particles of the aerogel is 5 to 80% by weight and more preferably 20 to 50% by weight expressed as the content of solid components in the coating material composition. When the content of the porous particles is smaller than 5% by weight, there is the possibility that the effect of decreasing the refractive index for the prevention of reflection is not sufficiently exhibited. When the content of the porous particles exceeds 80% by weight, there is the possibility that the formation of the uniform transparent coating film becomes difficult. Since the properties for film formation such as the strength and the transparency of the formed coating film are important for the practical applications, it is more preferable that the content of the porous substance comprising the aerogel is 20 to 50% by weight so that the strength of the coating film facilitating the handling and the excellent effect of decreasing the refractive index are simultaneously exhibited.

In the liquid crystal display device of the present invention, a cured coating film having a small refractive index can be easily formed, and an excellent low refractive index layer can be formed. For example, when the refractive index of the substrate is 1.60 or smaller, a cured coating film having a refractive index exceeding 1.60 is formed on the surface of the substrate as the intermediate layer, and a cured coating film of the coating material composition can be formed on the formed intermediate layer. The cured coating film as the intermediate layer can be formed using a conventional material having a great refractive index. When the refractive index of the intermediate layer exceeds 1.60, the difference in the refractive index from that of the cured coating film of the coating material composition is increased, and an antireflection substrate exhibiting the excellent antireflection property can be obtained. The intermediate layer may be formed with a plurality of layers having different refractive indices so that coloring of the cured coating film of the antireflection substrate is suppressed.

In the liquid crystal display device of the present invention, it is preferable that the maximum value of the reflectance at the surface of the low refractive index layer at an incident angle of 5 degrees is 1.4% or smaller, more preferably 1.3% or smaller and most preferably 1.1% or smaller at a wavelength of 430 to 700 nm. It is preferable that the reflectance at an incident angle of 5 degrees is 0.7% or smaller, and more preferably 0.6% or smaller at the wavelength of 550 nm. It is preferable that the maximum value of the reflectance at the surface of the low refractive index layer at the incident angle of 20 degrees is 1.5% or smaller and more preferably 1.4% or smaller at a wavelength of 430 to 700 nm. It is preferable that the reflectance at the incident angle of 20 degrees is 0.9% or smaller, and more preferably 0.9% or smaller at the wavelength of 550 nm. When the reflectances are each within the above respective ranges, reflection of light from the outside and glare are prevented, and the liquid crystal display device exhibiting excellent visibility can be obtained. The reflectance can be obtained using a spectrophotometer [manufactured by NIPPON BUNKO Co., Ltd.; Ultraviolet-Visible-Near infrared Spectrophotometer V570].

In the liquid crystal display device of the present invention, it is preferable that the transmission axis of the polarizer at the output side or the transmission axis of the polarizer at the incident side and the slow axis of Optical laminate (O) are approximately parallel or perpendicular to each other. When the angle is expressed as a value in the range of 0 to 90 degrees, "approximately parallel" means that the angle between two axes is 0 to 3 degrees and preferably 0 to 1 degree, and "approximately perpendicular" means that the angle between two axes is 87 to 90 degrees and preferably 89 to 90 degrees. When the angle between the transmission axis of the polarizer at an output side or the transmission axis of the polarizer at the incident side and the slow axis of Optical laminate (O) exceed 3 degrees and smaller than 87 degrees, there is the possibility that light leaks, and the quality of black depth decreases.

In the liquid crystal display device of the present invention, it is preferable that the slow axis of the optically anisotropic member and the slow axis of liquid crystal molecules in the liquid crystal cell under application of no voltage are approximately parallel or perpendicular to each other. When the angle is expressed as a value in the range of 0 to 90 degrees, "approximately parallel" means that the angle between two axes is 0 to 3 degrees and preferably 0 to 1 degree, and "approximately perpendicular" means that the angle between two axes is 87 to 90 degrees and preferably 89 to 90 degrees. When the angle between the slow axis of the optically anisotropic member and the slow axis of liquid crystal molecules in the liquid crystal cell under application of no voltage exceeds 3 degrees and smaller than 87 degrees, there is the possibility that light leaks and the quality of black depth decreases. The liquid crystal display device of the present invention provides the dark display when no voltage is applied.

In the liquid crystal display device of the present invention, it is preferable that at least one of the optically anisotropic members is one of a layer comprising a material having a negative intrinsic birefringence, a layer comprising discotic liquid crystal molecules or lyotropic liquid crystal molecules and a layer comprising a photo-isomerizable substance. The material having a negative value of intrinsic birefringence means a material exhibiting a property such that, when light is incident on a layer having molecules oriented in the uniaxial order, the refractive index with respect to light in the direction of the orientation is smaller than the refractive index with respect to light in the direction perpendicular to the direction of the orientation. Examples of the material having a negative value of intrinsic birefringence include vinyl aromatic polymers, polyacrylonitrile-based polymers, polymethyl methacrylate-based polymers, cellulose ester-based polymers and multi-component copolymers derived from these polymers. Among these materials, vinyl aromatic polymers, polyacrylonitrile-based polymers and polymethyl methacrylate-based polymers are preferable, and vinyl aromatic polymers are more preferable since the birefringence is exhibited to a great degree.

Examples of the vinyl aromatic polymer include polystyrene and copolymers of vinyl aromatic monomers such as styrene, α-methylstyrene, p-methylstyrene, p-chlorostyrene, p-nitrostyrene, p-aminostyrene, p-vinylbenzoic acid and p-phenylstyrene with other monomers such as ethylene, propylene, butadiene, isoprene, (meth)acrylonitrile, p-chloroacrylonitrile, methyl (meth)acrylate, ethyl (meth)acrylate, (meth)acrylic acid, maleic anhydride and vinyl acetate. Among these polymers, polystyrene and copolymers of styrene and maleic anhydride are preferable.

The processes for forming the layer comprising the material having a negative value of the intrinsic birefringence is not particularly limited. The process of stretching a film comprising a macromolecule having a negative value of intrinsic birefringence is preferable. The refractive index in the direction of thickness of the optically anisotropic member can be efficiently controlled by stretching the film. Another film may be laminated to the film having a negative intrinsic birefringence obtained by the stretching. A layer comprising the material having a negative value of the intrinsic birefringence can be formed by obtaining a substance having a multi-layer structure by laminating a film of another macromolecule to the film of the macromolecule having a negative value of the intrinsic birefringence via a layer of an adhesive resin and, then, stretching the obtained substance having a multi-layer structure. Due to the stretching after the substance having a multi-layer structure is formed, the stretching becomes possible even when the film comprising a macromolecule having a negative value of intrinsic birefringence has a small strength and stretching of the layer alone is difficult. The layer comprising the material having a negative value of intrinsic birefringence can be stretched with stability without fracture at a temperature where the birefringence is easily exhibited, and the optically anisotropic member satisfying the relation $(\Sigma n_{xi}+\Sigma n_{yi})/2 \leqq =\Sigma n_{zi}$ can be formed.

The process for stretching the film of a macromolecule having a negative value of the intrinsic birefringence or the substance having a multi-layer structure described above is not particularly limited. Examples of the process include uniaxial stretching processes such as the process of uniaxial stretching in the longitudinal direction utilizing the difference in the circumferential speed of rolls, and the process of uniaxial stretching in the transverse direction using a tenter; processes of biaxial stretching such as the process of simultaneous stretching comprising longitudinal stretching by increasing the distance between fixing clips and transverse stretching by an increase in the angle of opening of guide rails, and the process of successive stretching comprising longitudinal stretching utilizing the difference in the circumferential speed of rolls, followed by transverse stretching using a tenter by gripping both end portions by clips; and processes of oblique stretching such as the process using a tenter stretcher which can apply longitudinal or transverse feeding force, tensile force or winding force at different rightward and leftward speeds, or a tenter stretcher which has the same distance of movement with a fixed angle of stretching or has different distances of movement while longitudinal or transverse feeding force, tensile force or winding force can be applied at the same rightward and leftward speeds. Among these processes, the uniaxial stretching processes are preferable.

The discotic liquid crystal molecules are described in various references [for example, benzene derivatives described in C. Desrade et al., Mol. Crysr. Liq. Cryst., vol. 71, page 111 (1981); cyclohexane derivatives described in research reports by B. Kohne et al. and Angew. Chem., vol. 96, page 70 (1984); and aza crown-based molecules and phenylacetylene-based macrocycles described in research reports by J. M. Lehn et al., J. Chem. Commun., page 1794 (1985) and research reports by J. Zhang et al., J. Am. Chem. Sci. vol. 116, page 2655 (1994)]. In general, the discotic liquid crystal has a structure in which these molecules are placed as the mother nucleus and linear alkyl groups and alkoxyl groups and substituted benzoyloxyl groups are added as substituents in the form of linear chains in a radial shape.

Specific examples of the discotic crystal include compounds represented by the following formulae [17] and [18]:

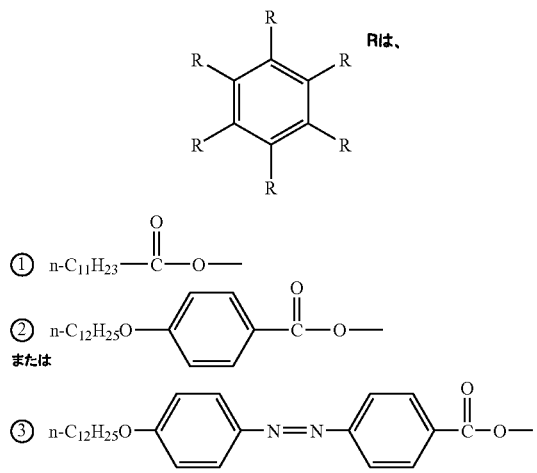

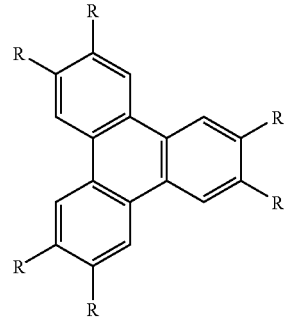

Rは、

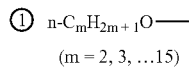
① n-C$_m$H$_{2m+1}$O—
(m = 2, 3, ...15)

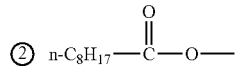
② n-C$_8$H$_{17}$—C(=O)—O—

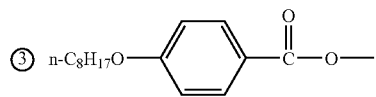
③ n-C$_8$H$_{17}$O—⟨benzene⟩—C(=O)—O—

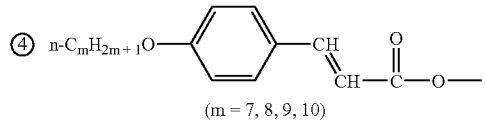
④ n-C$_m$H$_{2m+1}$O—⟨benzene⟩—CH=CH—C(=O)—O—
(m = 7, 8, 9, 10)

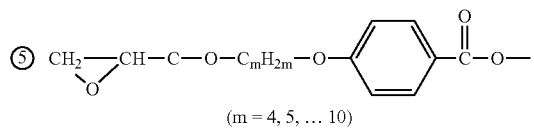
⑤ CH$_2$—CH—C—O—C$_m$H$_{2m}$—O—⟨benzene⟩—C(=O)—O—
    \O/
(m = 4, 5, ... 10)

または

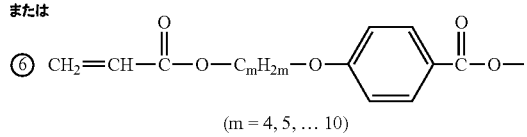
⑥ CH$_2$=CH—C(=O)—O—C$_m$H$_{2m}$—O—⟨benzene⟩—C(=O)—O—
(m = 4, 5, ... 10)

The process for forming a layer comprising the discotic liquid crystal molecules is not particularly limited. The process of laminating discotic liquid crystal molecules to a substrate is preferable, and the process of laminating discotic liquid crystal molecules to a substrate in a manner such that the face of the disk of the discotic liquid crystal molecules is oriented substantially perpendicularly to the face of the substrate is more preferable. By orienting the discotic liquid crystal molecules substantially perpendicularly to the face of the substrate, the optically anisotropic member satisfying the relation $(\Sigma n_{xi}+\Sigma n_{yi})/2 \leq \Sigma n_{zi}$ can be efficiently formed. Examples of the substrate to which the discotic liquid crystal molecules are laminated include films and plates of glass and synthetic resins. By laminating the discotic liquid crystal molecules to the surface of the polarizer and the optically anisotropic member used in the present invention, the weight and the thickness of the liquid crystal display device can be decreased, and the efficiency of production can be increased. The "substantially perpendicular orientation" means that the plane of the liquid crystal molecules is oriented at an angle in the range of 60 to 90 degrees with respect to the face of the substrate.

Examples of the process for orienting the discotic liquid crystal molecules in the substantially perpendicular direction include the process in which a film for perpendicular orientation coating the substrate is coated with a coating fluid comprising the discotic liquid crystal molecules or a combination of the discotic liquid crystal molecules, a polymerization initiator and other additives, and then the substances in the coating fluid are fixed to the film; and the process in which a film for perpendicular orientation is coated with the coating fluid, the substances in the coating fluid are fixed to the film, then the film for perpendicular orientation is removed, and the remaining layer comprising the discotic liquid crystal molecules is laminated to a substrate.

For the preparation of the coating fluid, water or an organic solvent can be used. Examples of the organic solvent include amides such as N,N-dimethylformamide; sulfoxides such as dimethyl sulfoxide; heterocyclic compounds such as pyridine; hydrocarbons such as benzene and hexane; halides such as chloroform and dichloromethane; esters such as methyl acetate and butyl acetate; ketones such as acetone and methyl ethyl ketone; and ethers such as tetrahydrofuran and 1,2-dimethoxy-ethane. The process for coating with the coating fluid is not particularly limited and can be conducted in accordance with a process such as the extrusion coating process, the direct gravure coating process, the reverse gravure coating process and the die coating process.

It is preferable that the perpendicularly oriented discotic liquid crystal molecules are fixed while the oriented condition is maintained. Examples of the process for the fixing include the process using the thermal polymerization using a thermal polymerization initiator and the process using the photopolymerization using a photopolymerization initiator. Among these processes, the process using the photo-polymerization is preferable. Examples of the photopolymerization initiator include α-carbonyl compounds, acyloin ethers, aromatic acyloin compounds substituted with an α-hydrocarbon, polynuclear quinone compounds, combinations of a triarylimidazole dimer and p-aminophenyl ketones, acridine and phenazine compounds and oxadiazole compounds.

The film for perpendicular orientation is a film having a small surface energy such that liquid crystal molecules can be oriented perpendicularly. The film for perpendicular orientation is, in general, formed with a polymer. As the polymer forming the film for perpendicular orientation, a polymer in which fluorine atom or a hydrocarbon group having 10 or more carbon atoms is introduced as a side chain of the polymer is preferable. As the hydrocarbon group, any of aliphatic groups and aromatic groups can be used. It is preferable that the main chain of the polymer has the structure of a polyimide or polyvinyl alcohol. The degree of polymerization of the polymer is preferably 200 to 5,000 and more preferably 300 to 3,000. The molecular weight of the polymer is preferably 9,000 to 200,000 and more preferably 13,000 to 130,000.

In the present invention, it is preferable that the rubbing treatment is conducted in the formation of the film for perpendicular orientation by rubbing the surface of the film comprising the polymer with paper or a cloth several times in a specific direction. After the liquid crystal molecules are oriented in the perpendicular direction using the film for perpendicular orientation, the layer of the optically anisotropic member is formed by fixing the liquid crystal molecules while the oriented condition is maintained. Then, the layer of the optically anisotropic member alone is transcribed to a film of a transparent polymer. The liquid crystal molecules fixed in the perpendicularly oriented condition can maintain the oriented condition without the film for perpendicular orientation. By the orientation of the discotic liquid crystal molecules, the direction providing the maximum in-plane refractive index within the layer containing the discotic liquid crystal molecules appears in the direction substantially parallel to the face of the disk of the discotic liquid crystal molecules.

The lyotropic liquid crystal molecule is a molecule exhibiting the liquid crystal property when the molecule is dissolved into a specific solvent in a concentration in a specific range. Examples of the lyotropic liquid crystal molecule include macromolecular lyotropic liquid crystal molecules obtained by dissolving a macromolecule having the main chain having a rod-like skeleton structure such as cellulose derivatives, polypeptides and nucleic acids; amphiphilic lyotropic liquid crystal molecules comprising a concentrated aqueous solution of an amphiphilic low molecular weight compound; and chromonic liquid crystal molecules comprising a solution of a low molecular weight compound having an aromatic ring provided with solubility in water. It is preferable that the lyotropic liquid crystal molecules used in the present invention are oriented in a specific direction under shearing force, and it is more preferable that the plane of the liquid crystal molecules can be oriented substantially perpendicularly to the face of the substrate. The "substantially perpendicular orientation" means that the plane of the liquid crystal molecules is oriented at angle in the range of 60 to 90 degrees with respect to the face of the substrate. Due to the substantially perpendicular orientation of the plane of the liquid crystal molecules, the refractive index of the optically anisotropic member in the direction of the thickness can be controlled, and the optically anisotropic member satisfying the relation $(\Sigma n_{xi} + \Sigma n_{yi})_2 \leq \Sigma n_{zi}$ can be formed.

Examples of the substrate to which the lyotropic liquid crystal molecules are laminated include films and plates of glass and synthetic resins. By laminating the lyotropic liquid crystal molecules to the surface of the polarizer and the optically anisotropic member used in the present invention, the weight and the thickness of the liquid crystal display device can be decreased, and the efficiency of production can be increased.

It is preferable that the lyotropic liquid crystal molecules used in the present invention have substantially no absorption in the region of visible light. Specific examples of the lyotropic liquid crystal molecule include compounds expressed by the following formulae [19] and [20]:

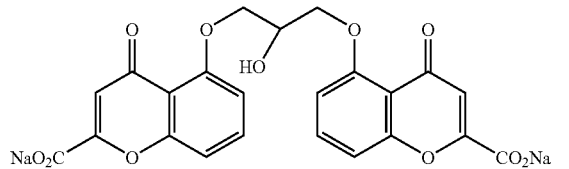

[19]

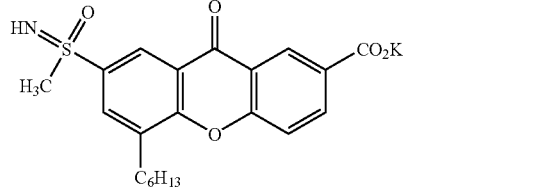

[20]

In the present invention, the process for forming the layer comprising the lyotropic liquid crystal molecules is not particularly limited. The process of orienting the lyotropic liquid crystal molecules substantially perpendicularly to the face of the substrate under shearing force is preferable. By orienting the lyotropic liquid crystal molecules perpendicularly to the face of the substrate, the refractive index of the optically anisotropic member in the direction of thickness can be efficiently controlled. As the process for perpendicularly orienting the lyotropic liquid crystal molecules, for example, a solution comprising the lyotropic liquid crystal molecules or a solution comprising the lyotropic liquid crystal molecules and additives are applied to a substrate and fixed there. In the orientation treatment, it is preferable that no film for orientation is used due to the reasons that the efficiency of production is excellent, the decrease in the weight and the thickness can be achieved, damages to the substrate can be prevented, and the coating can be achieved with a uniform thickness.

As the solvent for the preparation of the solution of the lyotropic liquid crystal molecules, water and organic solvents can be used. Examples of the organic solvent include amides such as N,N-dimethylformamide; sulfoxides such as dimethyl sulfoxide; heterocyclic compounds such as pyridine; hydrocarbons such as benzene and hexane; halides such as chloroform and dichloromethane; esters such as methyl acetate and butyl acetate; ketones such as acetone and methyl ethyl ketone; and ethers such as tetrahydrofuran and 1,2-dimethoxyethane. The concentration of the solution comprising the lyotropic liquid crystal molecules is not particularly limited as long as the solution exhibits the liquid crystal property. It is preferable that the lyotropic liquid crystal molecules are dissolved in the solvent in an amount in the range of 0.0001 to 100 parts by weight and more preferably in the range of 0.0001 to 1 part by weight per 100 parts by weight of the solvent. The process for coating with the solution of the lyotropic liquid crystal molecules is not particularly limited. Examples of the process include the extrusion coating process, the direct gravure coating process, the reverse gravure coating process and the die coating process.

In the present invention, it is preferable that the lyotropic liquid crystal molecules are fixed while the oriented condition is maintained. Examples of the process for fixing the lyotropic liquid crystal molecules include the removal of the solvent by drying, the thermal polymerization using a thermal polymerization initiator and the photopolymerization using a photopolymerization initiator. By the orientation of the lyotropic liquid crystal molecules, the direction providing the maximum in-plane refractive index within the layer containing the lyotropic liquid crystal molecules appears in the direction substantially parallel or substantially perpendicular to the molecular plane of the lyotropic liquid crystal molecules.

The photo-isomerizable substance means a compound which is sterically isomerized or structurally isomerized by light and, preferably, a compound which is further isomerized in the reverse direction by light having a different wavelength or by heat. The above compound include photochromic compounds which change the structure accompanied with a change in the color tone in the visible region. Examples of the photochromic compounds include azobenzene-based compounds, benzaldoxime-based compounds, azomethine-based compounds, stilbene-based compounds, spiropyrane-based compounds, spirooxazine-based compounds, fulgide-based compounds, diarylethene-based compounds, cinnamic acid-based compounds, retinal-based compounds and hemithioindigo-based compounds.

As the photo-isomerizable substance having a photo-isomerizable functional group, any of low molecular weight compounds and polymers can be used. When the photo-isomerizable substance is a polymer, the photo-isomerizable group may be either in the main chain or in a side chain. The polymer may be a homopolymer or a copolymer. When the polymer is a copolymer, the comonomers and the copolymer ratio can be suitably selected so that the ability of photo-isomerization and the glass transition temperature can be adjusted. In the present invention, the compound having the photo-isomerizable group may be a liquid crystal compound, at the same time. In other words, the liquid crystal molecule may be used as the compound having a photo-isomerizable functional group in the molecule. Example of the photo-isomerizable substance include the acrylic acid ester-based polymer expressed by chemical formula [21]:

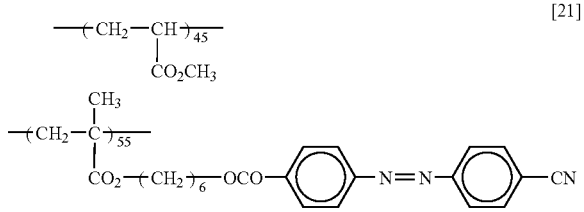

[21]

In the present invention, the process for forming the layer comprising the photo-isomerizable substance is not particularly limited. For example, a solution containing a photo-isomerizable substance is applied to a substrate to form a face of the film and, after a drying step, the formed face of the film is irradiated with a linear polarized light. It is preferable that the linear polarized light is applied in the direction perpendicular to the face of the film. The irradiation with the linear polarized light can be conducted when the coating layer has been approximately dried. The approximately dried condition may be considered to be the condition in which the residual amount of the solvent in the coating layer is 30% by weight or less. The temperature of the irradiation with the linear polarized light can be suitably selected in accordance with the residual amount of the solvent. It is preferable that the temperature of the irradiation with the linear polarized light is in the range of Tg−50° C. to Tg+30° C. when Tg represents the glass transition temperature of the photo-isomerizable substance. The source of the linear polarized light is not particularly limited. Examples of the source of the linear polarized light include a mercury lamp or a halogen lamp. By the irradiation with the linear polarized light, the direction providing the maximum in-plane refractive index within the layer containing the photo-isomerizable substance appears in the direction substantially perpendicular to the axis of polarization of the light of the irradiation. In accordance with the above process, the optically anisotropic member satisfying the relation $(\Sigma n_{xi}+\Sigma n_{yi})/2 \leq \Sigma n_{zi}$ can be efficiently formed. Examples of the substrate to which the solution comprising the photo-isomerizable substance is applied include films and plates of glass and synthetic resins. By laminating the photo-isomerizable substance to the surface of the polarizer and the optically anisotropic member used in the present invention, the weight and the thickness of the liquid crystal display device can be decreased, and the efficiency of production can be increased.

The solvent used for the preparation of the solution comprising the photo-isomerizable substance is not particularly limited. Examples of the solvent include methanol, methylene chloride, acetone and methyl ethyl ketone. The concentration of the solution is not particularly limited and can be suitably selected so that a viscosity suitable for the coating operation can be obtained. In general, a concentration of 1 to 50% by weight is preferable. The process for the coating is not particularly limited. For example, the coating can be conducted using a bar coater or a roll coater.

Figure 6:
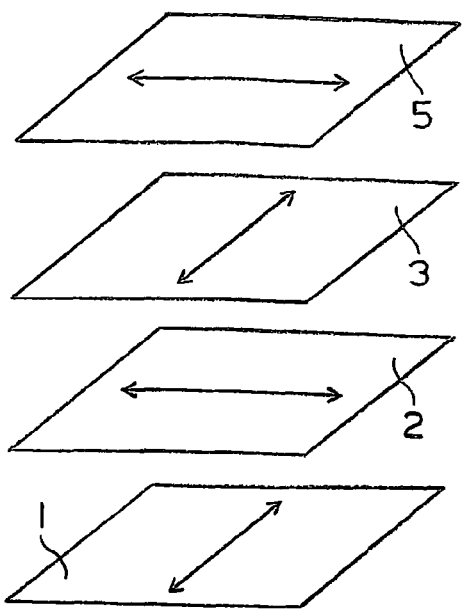
FIG. 6 shows a diagram exhibiting a layer construction of a conventional liquid crystal display device.
Figure 7:
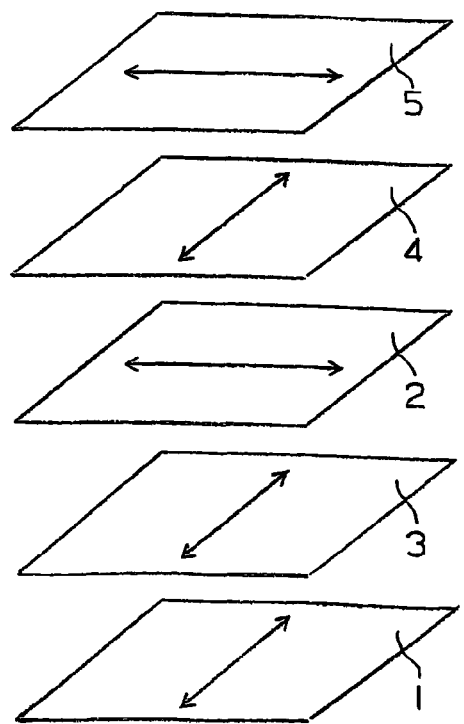
FIG. 7 shows a diagram exhibiting another layer construction of a conventional liquid crystal display device. In the Figures, the mark 1 means a polarizing plate at the incident side, the mark 2 means a liquid crystal cell, the mark 3 means an optically anisotropic member, the mark 4 means an optically anisotropic member and the mark 5 means a polarizing plate at the output side.

In general, the in-plane switching (IPS) mode, which is the mode of the liquid crystal display device, uses liquid crystal molecules homogenously oriented in the horizontal direction and two polarizers having transmission axes disposed at relative positions perpendicular to each other, one transmission axis being in the vertical direction and the other transmission axis being in the horizontal direction with respect to the front face of the display. Therefore, the sufficient contrast can be obtained since the two transmission axes are disposed in relative positions such that the two transmission axes are seen perpendicularly when the face of the display is observed at a horizontally or vertically oblique angle and, moreover, the homogeneously oriented liquid crystal layer shows little birefringence unlike liquid crystal layers of the twisted mode. However, when the face of the display is observed obliquely at the angle of 45 degrees, the angle between the transmission axes of the two polarizers shifts from 90 degrees, and leak of light takes place. Therefore, the sufficiently dark color is not obtained, and the contrast decreases. In the liquid crystal display device of the present invention, k sheets of optically anisotropic members satisfying the relation $(\Sigma n_{xi}+\Sigma n_{yi})/2 \leq \Sigma n_{zi}$ are disposed between two polarizers of the liquid crystal display device of the in-plane switching mode in a manner such that the in-plane slow axis of optically anisotropic member and the transmission axis of the polarizer are disposed at relative positions approximately parallel or approximately perpendicular to each other. Due to this arrangement of the relative positions, the phase difference formed by the liquid crystal in the liquid crystal cell is compensated with the optically anisotropic member used in the present invention, and compensation for the angle of field of the polarizer is also achieved. Due to the above construction, the phase difference formed in the transmitted light is effectively compensated to prevent the leak of light, and the excellent contrast can be obtained in observation at any desired angle in the entire range. FIGS. 2 to 5 show diagrams exhibiting four embodiments of the construction of the liquid crystal display device of the present invention. The liquid crystal display devices are constituted with a polarizing plate at the incident side 1, a liquid crystal cell 2, an optically anisotropic member 3, an optically anisotropic member 4 and a polarizing plate at the output side 5. The arrows in the Figures show absorption axes for polarizing plates and slow axes for liquid crystal cells and optically anisotropic members. FIGS. 6 and 7 show diagrams exhibiting two examples of the construction of conventional liquid crystal display devices.

The polarizer used in the liquid crystal display device of the present invention is not particularly limited. For example, a polarizer which is obtained from a film comprising a vinyl alcohol-based polymer, such as polyvinyl alcohol and polyvinyl alcohol with a partial formal treatment, after suitable treatments such as the dying with dichroic substances examples of which include iodine and dichroic dyes, the stretching treatment and the crosslinking treatment and transmits linear polarized light on incidence of natural light, can be used. The thickness is not particularly limited. In general, the thickness of the polarizer is 5 to 80 μm.

In general, protective films are attached to both faces of the polarizer, and the obtained laminate is used as a polarizing plate. As the protective film for the polarizer, films comprising a polymer exhibiting excellent transparency, mechanical strength, heat stability and property of preventing penetration of moisture can be used. Examples of the polymer include polymers having an alicyclic structure, polyolefins, polycarbonates, polyethylene terephthalate, polyvinyl chloride, polystyrene, polyacrylonitrile, polysulfones, polyether sulfones, polyarylates, triacetylcellulose and copolymers of (meth)acrylic acid esters and vinyl aromatic compounds. Among these polymers, polymers having an alicyclic structure and polyethylene terephthalate are preferable due to the excellent transparency, the light weight, the excellent dimensional stability and the easy control of the thickness of the film. Triacetylcellulose is preferable due to the excellent transparency and the light weight. The optically anisotropic member can be used as the protective film for the polarizer when the construction is such that the optically anisotropic member and the polarizer contact each other. (The optically anisotropic member can work also as the protective film for the polarizer.) The thickness of the liquid crystal display device can be decreased by using the optically anisotropic member also as the protective film for the polarizer.

Examples of the polymer having an alicyclic structure preferably used as the material for forming the protective film include norbornene-based polymers, polymers based on cyclic olefins having a single ring, vinyl alicyclic hydrocarbon polymers and hydrogenation products of these polymers. Among these polymers, the norbornene-based polymers are preferable due to the excellent transparency and molding property. Examples of the norbornene-based polymer include ring-opening polymers of norbornene-based monomers, ring-opening copolymers of norbornene-based monomers with other monomers and hydrogenation products of these polymers; and addition polymers of norbornene-based monomers, addition-type copolymers of norbornene-based monomers with other monomers and hydrogenation products of these polymers. Among these polymers, polymers and hydrogenation products of copolymers of norbornene-based monomers are preferable from the standpoint of transparency.

In the present invention, when the construction in which the optically anisotropic member and the polarizer contact each other is used and the optically anisotropic member is used also as the protective film of the polarizer, the optically anisotropic member and the polarizer can be attached to each other using an adhesive means such as an adhesive and a pressure sensitive adhesive. Examples of the adhesive and the pressure sensitive adhesive include adhesives and pressure sensitive adhesives based on acrylics, silicones, polyesters, polyurethanes, polyethers and rubbers. Among these adhesives and pressure sensitive adhesives, the acrylic adhesives and pressure sensitive adhesives are preferable due to the excellent heat resistance and transparency. The process for laminating the optically anisotropic member and the polarizer is not particularly limited. For example, pieces of the optically anisotropic member and the polarizer each having a prescribed size are obtained by cutting out from the sheets and then laminated together, or the optically anisotropic member and the polarizer each in the form of a long sheet are laminated in accordance with the roll-to-roll process.

In the steel wool test for evaluation of the scratch resistance of the surface at the side of observation of the polarizing plate at the output side of the present invention, steel wool #0000 is moved reciprocally ten times on the surface of the protective film of the polarizer at the output side under application of a load of 0.025 MPa, and then the change in the condition of the surface after the test is examined by the visual observation. For evaluation of the change in the reflectance before and after the steel wool test, the measurement is conducted at arbitrarily selected 5 different positions on the surface before and after the test, and the arithmetic average of the obtained values is calculated. In the above steel wool test, the change in the reflectance on the protective film of a polarizer at the side of observation before and after the test is preferably 10% or smaller and more preferably 8% or smaller. When the change in the reflectance exceeds 10%, blurred images may be formed or glare may arise. The change in the reflectance before and after the steel wool test is obtained in accordance with the following equation:

$$\Delta R=(R^b-R^a)/R^b \times 100 (\%)$$

wherein $R^b$ represents the reflectance before the steel wool test, and $R^a$ represents the reflectance after the steel wool test.

In the liquid crystal display device of the present invention, for example, suitable members such as a prism array sheet, a lens array sheet, a light diffusion plate, a back light and a film for enhancing luminance can be disposed at suitable positions each as a single layer or a plurality of layers. In the liquid crystal display device of the present invention, a cold cathode tube, a mercury planar lamp, a light emitting diode or an electroluminescence device can be used as the back light.

EXAMPLES

The present invention will be described more specifically with reference to examples in the following. However, the present invention is not limited to the examples.

In Examples, a liquid crystal cell of the in-plane switching mode having a thickness of 2.74 μm, a positive dielectric anisotropy, a birefringence of Δn=0.09884 at the wavelength of 550 nm and a pretilt angle of 0 degree was used as the liquid crystal cell.

In Examples and Comparative Example, measurements and evaluations were conducted in accordance with the following methods.

(1) Thickness

After an optical laminate was embedded into an epoxy resin, the laminate was sliced into pieces having a thickness of 0.05 μm using a microtome [manufactured by YAMATO KOKI KOGYO Co., Ltd.; RUB-2100], and the thickness of each piece was measured by observing the section using a scanning electron microscope. For a laminate, the thickness was measured for each layer.

(2) Major Refractive Indices

The direction of the in-plane slow axis of an anisotropic member with respect to light having a wavelength of 550 nm was measured using an automatic birefringence meter [manufactured by OJI KEISOKUKI Co., Ltd.; KOBRA-21] under the conditions of a temperature of 20±2° C. and a humidity of 60±5%, and the refractive index in the direction of the in-plane slow axis $n_x$, the refractive index in the direction within the plane and perpendicular to the slow axis $n_y$ and the refractive index in the direction of the thickness $n_z$ were measured.

(3) Retardation of Optical Laminate (O)

The retardation of light having a wavelength of 550 nm incident perpendicularly in the front direction ($R_0$) and the retardation of the same light incident at the angle of 40 degrees with respect to the normal ($R_{40}$) were measured using a high speed spectroscopic elipsometer [manufactured by J. A. WOOLLAM Company; M-2000U] under the conditions of a temperature of 20±2° C. and a humidity of 60±5%. The retardation of light incident at the angle of 40 degrees with respect to the normal ($R_{40}$) was measured in two directions, i.e., the α-direction existing within the Y-Z plane and expressed as the polar angle using the slow axis of Optical laminate (O) as the axis of rotation; and the β-direction existing within the X-Z plane and expressed as the polar angle using the fast axis of Optical laminate (O) as the axis of rotation.

(4) Viewing Angle Property

The property of display was observed in the front direction and in an oblique direction within 80 degrees as the polar angle while the display was adjusted at the dark display, and the property on the viewing angle property was evaluated as one of the following two grades:

A: excellent and uniform

B: poor (5) Contrast Ratio

A voltage of a rectangular wave (6 V for the bright display and 0 V for the dark display) of 55 Hz was applied to a liquid crystal cell, and the ratio of the transmittance of light in the bright display to the transmittance of light in the dark display were measured under the environment of 500 lux. The obtained result (the white/black ratio) was used as the contrast ratio.

(6) Reflectance

The reflection spectrum was measured at an incident angle of 5° using a spectrophotometer [manufactured by NIPPON BUNKO Co., Ltd.; "Ultraviolet-Visible-Near-infrared Spectrophotometer V-570"], and the reflectance at a wavelength of 550 nm was obtained.

(7) Refractive Indices of a Low Refractive Index Layer and a Hard Coat Layer

The measurement was conducted using a high speed spectroscopic elipsometer [manufactured by J. A. WOOLLAM Company; M-2000U] under the condition of a temperature of 20±2° C. and a humidity of 60±5% at incident angles of 55, 65 and 65 degrees, and the refractive indices were calculated from the obtained spectra in the wavelength range of 400 to 1,000 nm.

(8) Scratch Resistance

After a steel wool #0000 was moved reciprocally 10 times under a load of 0.05 MPa, the condition of the surface after the test was visually observed, and the result was evaluated as one of the following two grades:
A: no scratches found
B: scratches found (9) Visibility A panel in the dark display was visually observed, and the result was evaluated as one of the following three grades:
A: no glare or reflection found
AB: some glare or reflection found
B: glare and reflection found

(10) Wide band property

A liquid crystal display panel was set under the environment of the brightness of 100 lux. The color of the reflected light was visually observed, and the result was evaluated as one of the following two grades:
A: the color of the reflected light: black
B: the color of the reflected light: blue

(11) Weight-Average Molecular Weight

A calibration curve was prepared for a standard polystyrene using a gel permeation chromatograph [manufactured by TOSO Co., Ltd.; HLC8020], and the weight-average molecular weight expressed as the value of the corresponding polystyrene was obtained.

Preparation Example 1

Preparation of a Film of Optically Anisotropic Member A1

An unstretched laminate having layer [1] formed with a norbornene-based polymer [manufactured by ZEON Corporation; ZEONOR 1020; the glass transition temperature: 105° C.], layer [2] formed with a styrene-maleic anhydride copolymer [the glass transition temperature: 130° C.; the content of oligomers: 3% by weight] and layer [3] formed with a modified ethylene-vinyl acetate copolymer [Vicat softening point: 80° C.] and having a structure of layer [1] (33 μm)—layer [3] (8 μm)—layer [2] (65 μm)—layer [3] (8 μm)—layer [1] (33 μm) was obtained by the coextrusion molding. The obtained unstretched laminate was uniaxially stretched in the transverse direction under the conditions of a stretch ratio of 1.5, a stretching speed of 12%/min and a temperature of 135° C. using a tenter, and a long sheet of Optically anisotropic member A1 having the slow axis in the longitudinal direction of the sheet was obtained.

The obtained film of Optically anisotropic member A1 had major refractive indices $n_x$=1.57024, $n_y$=1.56927 and $n_z$=1.57048 and a thickness d=98 μm.

Preparation Example 2

Preparation of a Film of Optically Anisotropic Member B1

An unstretched laminate having layer [1] formed with a norbornene-based polymer [manufactured by ZEON Corporation; ZEONOR 1020; the glass transition temperature: 105° C.], layer [2] formed with a styrene-maleic anhydride copolymer [the glass transition temperature: 130° C.; the content of oligomers: 3% by weight] and layer [3] formed with a modified ethylene-vinyl acetate copolymer [Vicat softening point: 55° C.] and having a structure of layer [1] (38 μm)—layer [3] (10 μm)—layer [2] (76 μm)—layer [3] (10 μm)—layer [1] (38 μm) was obtained by the coextrusion molding. The obtained unstretched laminate was uniaxially stretched in the transverse direction under the conditions of a stretch ratio of 1.7, a stretching speed of 12%/min and a temperature of 134° C. using a tenter, and a long sheet of Optically anisotropic member B1 having the slow axis in the longitudinal direction of the sheet was obtained.

The obtained film of Optically anisotropic member had major refractive indices $n_x$=1.57041, $n_y$=1.56878 and $n_z$=1.57082 and a thickness d=101 μm.

Preparation Example 3

Preparation of a Film of Optically Anisotropic Member C1

A modified polyvinyl alcohol having a structure expressed by chemical formula (22) was dissolved into a mixed solvent of methanol and acetone (the ratio of amounts by volume: 50:50), and a solution having a concentration of 5% by weight was prepared. The prepared solution was applied to an optically isotropic transparent glass substrate having a length of 40 cm and a width of 30 cm using a bar coater to form a layer having a thickness of about 1 μm, and the formed layer was dried under a stream of the warm air at 60° C. for 2 minutes. The surface of the dried layer was treated by rubbing, and a perpendicularly oriented film was formed.

The formed perpendicularly oriented film was coated with a coating fluid containing 32.6% by weight of a discotic liquid crystal having a structure expressed by chemical formula [23], 0.7% by weight of cellulose acetate butyrate, 3.2% by weight of a modified trimethylolpropane triacrylate, 0.4% by weight of a sensitizer, 1.1% by weight of a photopolymerization initiator and 62.0% by weight of methyl ethyl ketone, and the discotic liquid crystal was oriented homogeneously. Then, the formed layer was irradiated with ultraviolet light for 1 second using a mercury lamp having a luminous density of 500 W/cm$^2$, and a film of Optically anisotropic member C1 was obtained. The molecules of the discotic liquid crystal were homogeneously oriented in a manner such that the slow axis was placed in the transverse direction of the optically isotropic transparent glass substrate.

The obtained film of Optically anisotropic member C1 had major refractive indices $n_x$=1.63353, $n_y$=1.53293 and $n_z$=1.63353, and the thickness of the layer of the discotic liquid crystal d was 4 μm.

Preparation Example 4

Preparation of a Film of Optically Anisotropic member D1

A long sheet of an unstretched film having a thickness of 100 μm and formed with a norbornene-based polymer [manufactured by ZEON Corporation; ZEONOR 1420R; the glass transition temperature: 136° C.] was obtained in accordance with the extrusion molding.

A modified polyvinyl alcohol having a structure expressed by chemical formula (22) was dissolved into a mixed solvent of methanol and acetone (the ratio of amounts by volume: 50:50), and a solution having a concentration of 5% by weight was prepared. The prepared solution was applied to the above unstretched film to form a layer having a thickness of about 1 μm, and the formed layer was dried under a stream of the warm air at 60° C. for 2 minutes. The surface of the dried layer was treated by rubbing, and a perpendicularly oriented film was formed.

The formed perpendicularly oriented film was coated with a coating fluid containing 22.3% by weight of a discotic liquid crystal having a structure expressed by chemical formula [24], 0.7% by weight of cellulose acetate butyrate, 3.2% by weight of a modified trimethylolpropane triacrylate, 0.4% by weight of a sensitizer, 1.1% by weight of a photopolymerization initiator and 72.3% by weight of methyl ethyl ketone, and the discotic liquid crystal was oriented homogeneously. Then, the formed layer was irradiated with ultraviolet light for 1 second using a mercury lamp having a luminous density of 500 W/cm², and a film of Optically anisotropic member D1 was obtained. The molecules of the discotic liquid crystal were homogeneously oriented in a manner such that the slow axis was placed in the longitudinal direction of the film of Optically anisotropic member D1.

The obtained film of Optically anisotropic member D1 had major refractive indices $n_x$=1.60497, $n_y$=1.59006 and $n_z$=1.60497, and the thickness of the layer of the discotic liquid crystal d was 4 μm.

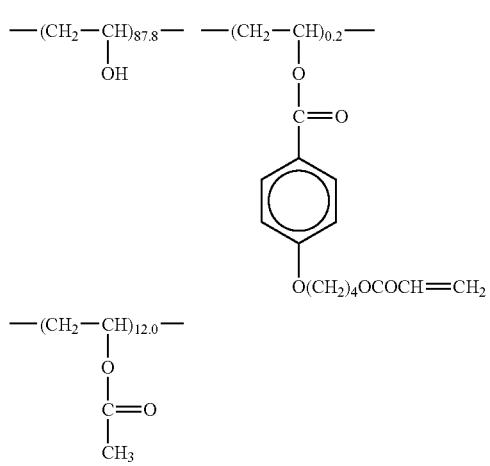

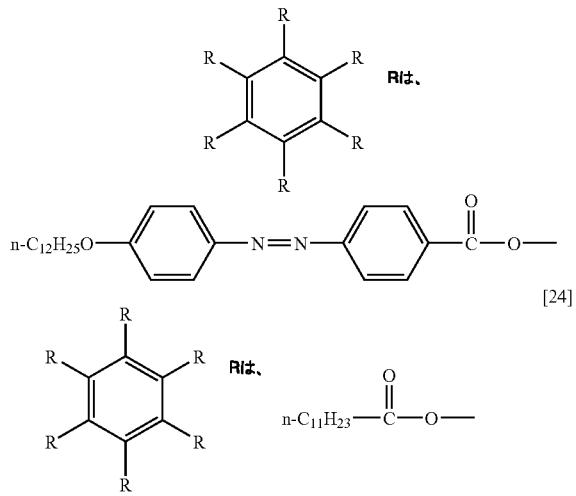

Preparation Example 5

Preparation of a Film of Optically Anisotropic Member E1

Into 830 parts by weight of methylene chloride, 170 parts by weight of a styrene-based polymer prepared by graft copolymerization of 90 parts by weight of a mixture of styrene, acrylonitrile and a-methylstyrene (the ratio of the amounts by weight: 60:20:20) to 10 parts by weight of a copolymer of styrene and butadiene (the ratio of the amounts by weight: 20:80) was dissolved. The prepared solution was made flow over a glass plate so that a film having a thickness of 96 mm was obtained after being dried. After the formed film was dried under the warm air of 45° C. for 20 minutes, the obtained film was cleaved from the glass plate, attached to a frame, dried at 70° C. for 1 hour and then at 110° C. for 15 hours and uniaxially stretched to a stretch ratio of 1.9 in the longitudinal direction at a temperature of 115° C. using a tensile tester (STROGRAPH), and a film of Optically anisotropic member E1 was obtained.

The obtained film of Optically anisotropic member E1 had major refractive indices $n_x$=1.55058, $n_y$=1.54884 and $n_z$=1.55058, and the thickness d=70 μm.

Preparation Example 6

Preparation of Composition for Forming a Hard Coat Layer H1

A six-functional urethane acrylate oligomer [manufactured by SHIN-NAKAMURA KAGAKU KOGYO Co., Ltd.; NK OLIGO U-6HA] in an amount of 30 parts by weight, 40 parts by weight of butyl acrylate, 30 parts by weight of isobornyl methacrylate [manufactured by SHIN-NAKAMURA KAGAKU KOGYO Co., Ltd.; NK ESTER IN and 10 parts by weight of 2,2-diphenylethan-1-one were mixed by a homogenizer. A 40% by weight methyl isobutyl ketone solution dispersion liquid of fine particles of antimony pentaoxide (the average particle diameter: 20 nm; one hydroxyl group is bonded to every antimony atom exposed to the surface of the pyrochlore structure) was mixed in an amount such that the weight of the fine particles of antimony pentaoxide was 50% by weight of the entire solid components of the obtained coating fluid for forming a hard coat layer, and Composition for forming a hard coat layer H1 was prepared.

Preparation Example 7

Preparation of Composition for Forming a Low Refractive Index Layer L1

To 166.4 parts by weight of tetraethoxysilane, 392.6 parts by weight of methanol was added, and then 11.7 parts by weight of heptadecafluorodecyltriethoxysilane $CF_3(CF_2)_7CH_2CH_2Si(OC_2H_5)$ and 29.3 parts by weight of a 0.005 mole/liter hydrochloric acid ($[H_2O]/[OR]=0.5$) were added. The obtained mixture was mixed well using a disper, and a mixed solution was obtained. The obtained mixed solution was stirred in a bath kept at a constant temperature of 25° C. for 2 hours, and Copolymer hydrolyzate (B) of a fluorine/silicone copolymer having a weight-average molecular weight adjusted at 830 was obtained as the material for forming a matrix (the content of solid components expressed as the content of the condensed compound: 10% by weight).

Then, a sol containing hollow silica dispersed in isopropyl alcohol [manufactured by SHOKUBAI KASEI KOGYO Co., Ltd.; the average diameter of primary particles: about 60 nm; the thickness of the outer shell: about 10 nm; the content of solid components: 20% by weight] as the hollow fine particles of silica was added to Copolymer hydrolyzate (B) of a fluorine/silicone copolymer in an amount such that the ratio of the amounts by weight of the hollow fine particles of silica to Copolymer hydrolyzate (B) of a fluorine/silicone copolymer (expressed as the amount of the condensed compound) was 50/50 based on the amount of the solid components. The obtained mixture was diluted with a mixed solution of isopropyl alcohol, butyl acetate and butylcellosolve (a mixed solution prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was adjusted at 1% by weight. Then, a solution prepared by diluting dimethylsiliconediol (n: about 40) with ethyl acetate in a manner such that the content of the solid component was adjusted at 1% by weight was added in an amount such that the content of the solid component of dimethylsiliconediol was 2% by weight based on the sum of the amounts of the solid components of the hollow fine particles of silica and Copolymer hydrolyzate (B) of a fluorine/silicone copolymer (expressed as the amount of the condensed compound), and Composition for forming a low refractive index layer L1 was prepared.

Preparation Example 8

Preparation of Composition for Forming a Low Refractive Index Layer L2

To 208 parts by weight of tetraethoxysilane, 356 parts by weight of methanol was added, and then 36 parts by weight of a 0.005 mole/liter hydrochloric acid ($[H_2O]/[OR]=0.5$) was added. The obtained mixture was mixed well using a disper, and a mixed solution was obtained. The obtained mixed solution was stirred in a bath kept at a constant temperature of 25° C. for 2 hours, and Hydrolyzate (A) of a silicone having a weight-average molecular weight adjusted at 850 was obtained as the material for forming a matrix (the content of solid components expressed as the content of the condensed compound: 10% by weight).

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Hydrolyzate (A) of a silicone in an amount such that the ratio of the amounts by weight of the hollow fine particles of silica to Hydrolyzate (A) (expressed as the amount of the condensed compound: 10% by weight) was 60/40 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was adjusted at 1% by weight. Then, a solution prepared by diluting dimethylsiliconediol (n: about 250) with ethyl acetate in a manner such that the content of the solid component was adjusted at 1% by weight was added in an amount such that the amount of the solid component of dimethylsiliconediol was 2% by weight based on the sum of the amounts of the solid components of the hollow fine particles of silica and Hydrolyzate (A), and Composition for forming a low refractive index layer L2 was prepared.

Preparation Example 9

Preparation of Composition for Forming a Low Refractive Index Layer L3

To 166.4 parts by weight of tetraethoxysilane, 493.1 parts by weight of methanol was added, and then 30.1 parts by weight of a 0.005 mole/liter hydrochloric acid ($[H_2O]/[OR]=0.5$) was added. The obtained mixture was mixed well using a disper, and a mixed solution was obtained. The obtained mixed solution was stirred in a bath kept at a constant temperature of 25° C. for 2 hours, and Hydrolyzate (A) of a silicone having a weight-average molecular weight adjusted at 850 was obtained. Then, 30.4 parts by weight of $(H_3CO)_3SiCH_2CH_2(CF_2)_7CH_2CH_2Si(OCH_3)_3$ as component (C) was added. The obtained mixture was stirred in a bath kept at a constant temperature of 25° C. for 1 hour, and a material for forming a matrix was obtained (the content of solid components expressed as the content of the condensed compound: 10% by weight).

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Hydrolyzate (A) of a silicone in an amount such that the ratio of the amounts by weight of the hollow fine particles of silica to the material for forming a matrix (expressed as the amount of the condensed compound) was 40/60 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was adjusted at 1% by weight. Then, a solution prepared by diluting dimethylsiliconediol (n: about 40) with ethyl acetate in a manner such that the content of the solid component was adjusted at 1% by weight was added in an amount such that the amount of the solid component of dimethylsiliconediol was 2% by weight based on the sum of the amounts of the solid components of the hollow fine particles of silica and the material for forming a matrix (expressed as the amount of the condensed compound), and Composition for forming a low refractive index layer L3 was prepared.

Preparation Example 10

Preparation of Composition for Forming a Low Refractive Index Layer L4

To 208 parts by weight of tetraethoxysilane, 356 parts by weight of methanol was added, and then 36 parts by weight of a 0.005 mole/liter hydrochloric acid ($[H_2O]/[OR]=0.5$) was added. The obtained mixture was mixed well using a disper, and a mixed solution was obtained. The obtained mixed solution was stirred in a bath kept at a constant temperature of 25° C. for 2 hours, and Hydrolyzate (A) of a silicone having a weight-average molecular weight adjusted at 780 was obtained as the material for forming a matrix.

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Hydrolyzate (A) of a silicone in an amount such that the ratio of the amounts by weight of the hollow fine particles of silica to the hydrolyzate of a silicone (expressed as the amount of the condensed compound) was 50/50 based on the amount of the solid components. The obtained mixture was stirred in a bath kept at a constant temperature of 25° C. for 2 hours, and a re-hydrolyzate having a weight-average molecular weight adjusted at 980 was obtained (the content of solid components expressed as the content of the condensed compound: 10% by weight).

Separately, 439.8 parts by weight of methanol was added to 104 parts by weight of tetraethoxysilane, and then 36.6 parts by weight of heptadecafluorodecyltriethoxysilane $CF_3(CF_2)_7CH_2CH_2Si(OC_2H_5)$ and 19.6 parts by weight of a 0.005 mole/liter hydrochloric acid ($[H_2O]/[OR]=0.5$) were added. The obtained mixture was mixed well using a disper, and a mixed solution was obtained. The obtained mixed solution was stirred in a bath kept at a constant temperature of 25° C. for 2 hours, and Copolymer hydrolyzate (B) of a fluorine/silicone copolymer having a weight-average molecular weight adjusted at 850 was obtained (the content of solid components expressed as the content of the condensed compound: 10% by weight).

The re-hydrolyzate (containing the hollow fine particles of silica) and Copolymer hydrolyzate (B) of a fluorine/silicone copolymer were mixed in amounts such that the ratio of the amounts by weight of the re-hydrolyzate (containing the hollow fine particles of silica) and Copolymer hydrolyzate (B) of a fluorine/silicone copolymer was 80/20 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was adjusted at 1% by weight, and Composition for forming a low refractive index layer L4 was prepared.

Preparation Example 11

Preparation of Composition for Forming a Low Refractive Index Layer L5

To 166.4 parts by weight of tetraethoxysilane, 493.1 parts by weight of methanol was added, and then 30.1 parts by weight of a 0.005 mole/liter hydrochloric acid ($[H_2O]/[OR]=0.5$) was added. The obtained mixture was mixed well using a disper, and a mixed solution was obtained. The obtained mixed solution was stirred in a bath kept at a constant temperature of 25° C. for 2 hours, and Hydrolyzate (A) of a silicone having a weight-average molecular weight adjusted at 850 was obtained as the material for forming a matrix. Then, 30.4 parts by weight of $(H_3CO)_3SiCH_2CH_2(CF_2)_7CH_2CH_2Si(OCH_3)_3$ as component (C) was added. The obtained mixture was stirred in a bath kept at a constant temperature of 25° C. for 1 hour, and a material for forming a matrix was obtained (the content of solid components expressed as the content of the condensed compound: 10% by weight).

Separately, a solution was prepared by mixing tetramethoxysilane, methanol, water and a 28% by weight solution of ammonia in relative amounts by weight of 470:812:248:6, respectively. After the prepared solution was stirred for 1 minute, hexamethyldisilazane was added in an amount of 20 parts by weight per 100 parts by weight of the solution. The resultant solution was stirred and then diluted with isopropyl alcohol to a volume twice the original volume, and an organosilica sol having dispersed porous particles of silica (the average particle diameter: 50 nm) was prepared.

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Hydrolyzate (A) of a silicone in an amount such that the ratio of the amounts by weight of the hollow fine particles of silica, the porous particles and the material for forming a matrix (expressed as the amount of the condensed compound) was 30/10/60 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was adjusted at 1% by weight. Then, a solution prepared by diluting dimethylsiliconediol (n: about 250) with ethyl acetate in a manner such that the content of the solid component was adjusted at 1% by weight was added in an amount such that the content of the solid component of dimethylsiliconediol was adjusted at 2% by weight based on the sum of the amounts of the solid components of the hollow fine particles of silica and the material for forming a matrix (expressed as the amounts of the condensed compounds), and Composition for forming a low refractive index layer L5 was prepared.

Preparation Example 12

Preparation of Composition for Forming a Low Refractive Index Layer L6

To 156 parts by weight of tetraethoxysilane, 402.7 parts by weight of methanol was added, and then 13.7 parts by weight of heptadecafluorodecyltriethoxysilane $CF_3(CF_2)_7CH_2CH_2Si(OC_2H_5)$ and 27.6 parts by weight of a 0.005 mole/liter hydrochloric acid ($[H_2O]/[OR]=0.5$) were added. The obtained mixture was mixed well using a disper, and a mixed solution was obtained. The obtained mixed solution was stirred in a bath kept at a constant temperature of 25° C. for 2 hours, and Copolymer hydrolyzate (B) of a fluorine/silicone copolymer having a weight-average molecular weight adjusted at 830 as the material for forming a matrix was obtained (the content of solid components expressed as the content of the condensed compound: 10% by weight).

Separately, 356 parts by weight of methanol was added to 208 parts by weight of tetraethoxysilane, and then 126 parts by weight of water and 18 parts by weight of a 0.01 mole/liter hydrochloric acid ($[H_2O]/[OR]=0.5$) were added. The resultant mixture was mixed well by a disper, and a mixed solution was obtained. The obtained mixed solution was stirred in a bath kept at a constant temperature of 60° C. for 2 hours to adjust the weight-average molecular weight to 8,000, and a complete hydrolyzate of a silicone was obtained (the content of solid components expressed as the condensed compounds: 10% by weight).

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Copolymer hydrolyzate (B) of a fluorine/silicone copolymer in an amount such that the ratio of the amounts by weight of the hollow fine particles of silica, Copolymer hydrolyzate (B) of a fluorine/silicone copolymer and the complete hydrolyzate (expressed as the amount of the condensed compound) was 50/40/10 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was 1% by weight. Then, a solution prepared by diluting dimethylsiliconediol (n: about 40) with ethyl acetate in a manner such that the content of the solid component was adjusted at 1% by weight was added in an amount such that the content of the solid component of dimethylsiliconediol was 4% by weight based on the sum of the amounts of the solid components of the hollow fine particles of silica, Copolymer hydrolyzate (B) and the complete hydrolyzate of a silicone (expressed as the amounts of the condensed compounds), and Composition for forming a low refractive index layer L6 was prepared.

Preparation Example 13

Preparation of Composition for Forming a Low Refractive Index Layer L7

To 166.4 parts by weight of tetraethoxysilane, 493.1 parts by weight of methanol was added, and then 30.1 parts by weight of a 0.005 mole/liter hydrochloric acid ($[H_2O]/[OR]=0.5$) was added. The obtained mixture was mixed well using a disper, and a mixed solution was obtained. The obtained mixed solution was stirred in a bath kept at a constant temperature of 25° C. for 1 hour, and Hydrolyzate (A) of a silicone having a weight-average molecular weight adjusted at 800 was obtained as the material for forming a matrix. Then, 30.4 parts by weight of $(H_3CO)_3SiCH_2CH_2(CF_2)_7CH_2CH_2Si(OCH_3)_3$ as component (C) was added. The obtained mixture was stirred in a bath kept at a constant temperature of 25° C. for 1 hour, and a material for forming a matrix having a weight-average molecular weight adjusted at 950 was obtained (the content of solid components expressed as the content of the condensed compound: 10% by weight).

Then, a sol containing hollow silica dispersed in isopropyl alcohol [manufactured by SHOKUBAI KASEI KOGYO Co., Ltd.; the average diameter of primary particles: 60 nm; the thickness of the outer shell: about 10 nm; the content of solid components: 20% by weight] as the hollow fine particles of silica was added to Hydrolyzate (A) of a silicone in an amount such that the ratio of the amounts by weight of the hollow fine particles of silica to Hydrolyzate (A) of a silicone (expressed as the amount of the condensed compound) was 30/70 based on the amount of the solid components. The obtained mixture was diluted with a mixture of isopropyl alcohol, butyl acetate and butylcellosolve (a mixed solvent prepared in advance in a manner such that the content of butyl acetate was adjusted at 5% by weight and the content of butylcellosolve was adjusted at 2% by weight based on the amount of the entire solution obtained by the dilution) in a manner such that the content of the entire solid components was 1% by weight. Then, a solution prepared by diluting dimethylsiliconediol (n: about 40) with ethyl acetate in a manner such that the content of the solid component was adjusted at 1% by weight was added in an amount such that the content of the solid component of dimethylsiliconediol was 2% by weight based on the sum of the amounts of the solid components of the hollow fine particles of silica and the material for forming a matrix (expressed as the amounts of the condensed compounds), and Composition for forming a low refractive index layer L7 was prepared.

Preparation Example 14

Preparation of a Polarizer

A PVA film having a thickness of 85 μm [manufactured by KURARAY Co., Ltd.; VINYLON #8500] was attached to chucks and stretched to a length 2.5 times the original length. The stretched film was dipped into an aqueous solution containing 0.2 g/liter of iodine and 60 g/liter of potassium iodide at 30° C. for 240 seconds and, then, into an aqueous solution containing 70 g/liter of boric acid and 30 g/liter of potassium iodide. The film was uniaxially stretched to a length 6.0 time the original length while kept being dipped and kept in the stretched condition for 5 minutes. As the final step, the film was dried at the room temperature for 24 hours, and a polarizer having an average thickness of 30 μm and a degree of polarization of 99.993% was obtained.

Preparation Example 15

Preparation of Polarizer P

One face of a triacetylcellulose film [manufactured by KONICA MINOLTA Co., Ltd.; KC8UX2M] was coated with a 1.5 mole/liter isopropyl alcohol solution of potassium hydroxide in an amount of 25 ml/m², and the formed coating layer was dried at 25° C. for 5 seconds. The surface of the film was washed with flowing water for 10 seconds and dried by blowing with the air at 25° C. One face alone of the triacetylcellulose film was saponified in the manner described above.

The triacetylcellulose film was laminated to the face at the incident side of the polarizer obtained in Preparation Example 14 in accordance with the roll-to-roll process using a polyvinyl alcohol-based adhesive in a manner such that the saponified face of the film was brought into contact with one face of the polarizer, and Polarizer P was obtained.

Preparation Example 16

Preparation of a Polarizing Plate Attached with a Low Refractive Index Layer (a TAC Substrate))

One face of a triacetylcellulose film [manufactured by KONICA MINOLTA Co., Ltd.; KC8UX2M] was coated with a 1.5 mole/liter isopropyl alcohol solution of potassium hydroxide in an amount of 25 ml/m$^2$, and the film was dried at 25° C. for 5 seconds. The surface of the film was washed with flowing water for 10 seconds and dried by blowing with the air at 25° C. One face alone of the triacetylcellulose film was saponified in the manner described above.

The other face of the above film was treated with the corona discharge using a high frequency oscillator [manufactured by KASUGA DENKI Co., Ltd.; an electric source of the high frequency wave AGI-024; the output: 0.8 kW), and a substrate film treated on both faces and having a surface tension of 0.055 N/m was obtained.

The face of the above substrate film treated with the corona discharge was coated with Composition for forming a hard coat layer H1 obtained in Preparation Example 6 using a die coater. The formed coating layer was dried in a drying oven at 80° C. for 5 minutes, and a coating film was obtained. The coating film was irradiated with ultraviolet light (the integral amount of irradiation: 300 mJ/cm$^2$) to form a hard coat layer having a thickness of 5 μm, and Laminate film 1A was obtained. The hard coat layer of the Laminate film 1A had a refractive index of 1.62 and the pencil hardness at the side of the hard coat layer of the Laminate film was 2H.

The face of Laminate film 1A at the side of the hard coat layer was coated with Composition for forming a low refractive index layer L1 obtained in Preparation Example 7 using a wire bar coater, and the formed coating layer was dried by leaving standing for 1 hour. The obtained coating film was treated by heating under an atmosphere of oxygen at 120° C. for 10 minutes to laminate a low refractive index layer having a thickness of 100 nm, and a substrate having a low refractive index layer (a TAC substrate) was obtained. The obtained substrate having a low refractive index layer (the TAC substrate) was laminated with the polarizer obtained in Preparation Example 14 in a manner such that the saponified face of the substrate having a low refractive index layer was brought into contact with one face of the polarizer using a polyvinyl alcohol-based adhesive in accordance with the roll-to-roll process, and Polarizing plate attached with a low refractive index layer (a TAC substrate) 2A was obtained.

Preparation Example 17

Preparation of a Polarizing Plate Attached with a Low Refractive Index Layer (a COP Substrate))

A long sheet of an unstretched film having a thickness of 100 μm formed with a norbornene-based polymer [manufactured by ZEON Corporation; ZEONOR 1420R; the glass transition temperature: 136° C.] was obtained in accordance with the extrusion molding. Both faces of the above sheet of an unstretched film was treated with the corona discharge using a high frequency oscillator [manufactured by KASUGA DENKI Co., Ltd.; an electric source of the high frequency wave AG10024; the output: 0.8 kW], and a substrate film having a surface tension of 0.072 N/m was obtained.

One face of the above substrate film treated with the corona discharge was coated with Composition for forming a hard coat layer H1 obtained in Preparation Example 6 using a die coater. The formed coating layer was dried in a drying oven at 80° C. for 5 minutes, and a coating film was obtained. The coating film was irradiated with ultraviolet light (the integral amount of irradiation: 300 mJ/cm$^2$) to form a hard coat layer having a thickness of 5 μm, and Laminate film 1B was obtained. The hard coat layer of the Laminate film 1B had a refractive index of 1.62 and the pencil hardness of at the side of the hard coat layer of the Laminate film was H.

The face of Laminate film 1B at the side of the hard coat layer was coated with Composition for forming a low refractive index layer L3 obtained in Preparation Example 9 using a wire bar coater, and the formed coating layer was dried by leaving standing for 1 hour. The obtained coating film was treated by heating under an atmosphere of oxygen at 120° C. for 10 minutes to form a low refractive index layer having a thickness of 100 nm, and a substrate having a low refractive index layer (a COP substrate) was obtained. The obtained substrate having a low refractive index layer (the COP substrate) was laminated with the polarizer obtained in Preparation Example 14 in a manner such that the face of the substrate having a low refractive index layer (the COP substrate) to which the layer having a low refractive index was not laminated was brought into contact with one face of the polarizer using an acrylic adhesive in accordance with the roll-to-roll process, and Polarizing plate attached with a low refractive index layer (a COP substrate)-2C was obtained.

Example 1

Preparation of Liquid Crystal Display Device 1

The film of Optically anisotropic member B1 obtained in Preparation Example 1, a liquid crystal cell and the film of Optically anisotropic film A1 obtained in Preparation Example 1 were laminated in this order in a manner such that the slow axis of the film of Optically anisotropic member B1 and the slow axis of the liquid crystal cell under application of no voltage were perpendicular to each other, and the slow axis of the liquid crystal cell under application of no voltage and the slow axis of the film of Optically anisotropic member A1 were parallel to each other, and Optical laminate 1 was prepared.

The obtained Optical laminate 1 had a retardation of perpendicularly incident light ($R_0$) of 201 nm, retardations of light incident at the angle of 40 degrees with respect to the normal ($R_{40}$) of 198 nm in the α-direction and 207 nm in the β-direction and values of $R_{40}/R_0$ of 0.99 in the α-direction and 1.03 in the β-direction when the light had a wavelength of 550 nm.

Then, Polarizer P obtained in Preparation Example 15 was laminated with Optical laminate 1 in a manner such that the absorption axis of Polarizer P and the slow axis of the film of Optically anisotropic member B1 were parallel to each other, and the face of Polarizer P on which no protective film was laminated was brought into contact with the film of Optically anisotropic member B1.

Then, Polarizing plate attached with a low refractive index layer (the TAC substrate) 2A obtained Preparation Example 16 was laminated with Optical laminate 1 in a manner such that the absorption axis of Polarizing plate attached with a low refractive index layer (the TAC substrate) 2A and the slow axis of the film of Optically anisotropic member A1 were parallel to each other, and the face of Polarizing plate attached with a low refractive index layer (the TAC substrate) 2A on which no low refractive index layer was laminated was brought into contact with the film of Optically anisotropic member A1, and Liquid crystal display device 1 was prepared.

When the obtained liquid crystal device was examined by the visual observation, the display screen was excellent and uniform in viewing the image in the front direction and in oblique directions within 80 degrees as the polar angle. The results of the evaluation are shown in Table 1.

Example 2

Preparation of Liquid Crystal Display Device 2

Polarizing plate having a low refractive index (a TAC substrate) 2B was obtained in accordance with the same procedures as those conducted in Preparation Example 16 except that Composition for forming a low refractive index layer L2 obtained in Preparation Example 8 was used in place of Composition for forming a low refractive index layer L1 used in Preparation Example 16.

Then, Liquid crystal display device 2 was prepared in accordance with the same procedures as those conducted in Example 1 except that Polarizing plate attached with a low refractive layer (a TAC substrate) 2B prepared above was used in place of Polarizing plate attached with a low refractive layer (a TAC substrate) 2A used in Example 1. The results of the evaluation of the obtained Liquid crystal display device 2 are shown in Table 1.

Example 3

Preparation of Liquid Crystal Display Device 3

Liquid crystal display device 3 was prepared in accordance with the same procedures as those conducted in Example 1 except that Polarizing plate attached with a low refractive layer (a COP substrate) 2C prepared in Preparation Example 17 was used in place of Polarizing plate attached with a low refractive layer (a TAC substrate) 2A used in Example 1. The results of evaluation of the obtained Liquid crystal display device 3 are shown in Table 1.

Example 4

Preparation of Liquid Crystal Display Device 4

Polarizing plate having a low refractive index (a TAC substrate) 2D was obtained in accordance with the same procedures as those conducted in Preparation Example 16 except that Composition for forming a low refractive index layer L4 obtained in Preparation Example 10 was used in place of Composition for forming a low refractive index layer L1 used in Preparation Example 16.

Then, Liquid crystal display device 4 was prepared in accordance with the same procedures as those conducted in Example 1 except that Polarizing plate attached with a low refractive layer (a TAC substrate) 2D prepared above was used in place of Polarizing plate attached with a low refractive layer (a TAC substrate) 2A used in Example 1. The results of the evaluation of the obtained Liquid crystal display device 4 are shown in Table 1.

Example 5

Preparation of Liquid Crystal Display Device 5

Polarizing plate having a low refractive index (a TAC substrate) 2E was obtained in accordance with the same procedures as those conducted in Preparation Example 16 except that Composition for forming a low refractive index layer L5 obtained in Preparation Example 11 was used in place of Composition for forming a low refractive index layer L1 used in Preparation Example 16.

Then, Liquid crystal display device 5 was prepared in accordance with the same procedures as those conducted in Example 1 except that Polarizing plate attached with a low refractive layer (a TAC substrate) 2E prepared above was used in place of Polarizing plate attached with a low refractive layer (a TAC substrate) 2A used in Example 1. The results of the evaluation of the obtained Liquid crystal display device 5 are shown in Table 1.

Example 6

Preparation of Liquid Crystal Display Device 6

Polarizing plate having a low refractive index (a TAC substrate) 2F was obtained in accordance with the same procedures as those conducted in Preparation Example 16 except that Composition for forming a low refractive index layer L6 obtained in Preparation Example 12 was used in place of Composition for forming a low refractive index layer L1 used in Preparation Example 16.

Then, Liquid crystal display device 6 was prepared in accordance with the same procedures as those conducted in Example 1 except that Polarizing plate attached with a low refractive layer (a TAC substrate) 2F prepared above was used in place of Polarizing plate attached with a low refractive layer (a TAC substrate) 2A used in Example 1. The results of the evaluation of the obtained Liquid crystal display device 6 are shown in Table 1.

Example 7

Preparation of Liquid Crystal Display Device 7

The film of Optically anisotropic member D1 obtained in Preparation Example 4, the film of Optically anisotropic film C1 obtained in Preparation Example 3 and a liquid crystal cell were laminated in this order in a manner such that the slow axis of the film of Optically anisotropic member D1 and the slow axis of the film of Optically anisotropic member C1 were perpendicular to each other, and the slow axis of the film of Optically anisotropic member C1 and the slow axis of the liquid crystal cell under application of no voltage were parallel to each other, and Optical laminate 2 was prepared.

The obtained Optical laminate 1 had a retardation of perpendicularly incident light ($R_0$) of 614 nm, retardations of light incident at the angle of 40 degrees with respect to the normal ($R_{40}$) of 600 nm in the α-direction and 633 nm in the β-direction and values of $R_{40}/R_0$ of 0.98 in the α-direction and 1.03 in the β-direction when the light had a wavelength of 550 nm.

Then, Polarizer P obtained in Preparation Example 15 was laminated with Optical laminate 2 in a manner such that the absorption axis of Polarizer P and the slow axis of the film of Optically anisotropic member D1 were parallel to each other, and the face of Polarizer P on which no protective film was laminated was brought into contact with the film of Optically anisotropic member D1.

Then, Polarizing plate attached with a low refractive index layer (the TAC substrate) 2A obtained Preparation Example 16 was laminated with Optical laminate 2 in a manner such that the absorption axis of Polarizing plate attached with a low refractive index layer (the TAC substrate) 2A and the slow axis of the film of Optically anisotropic member C1 were parallel to each other, and the face of Polarizing plate attached with a low refractive index layer (the TAC substrate) 2A on which no low refractive index layer was laminated was brought into contact with the film of Optically anisotropic member C1, and Liquid crystal display device 7 was prepared. The results of the evaluation of the obtained Liquid crystal display device 7 are shown in Table 1.

Example 8

Preparation of Liquid Crystal Display Device 8

Liquid crystal display device 8 was prepared in accordance with the same procedures as those conducted in Example 7 except that Polarizing plate attached with a low refractive layer (a COP substrate) 2C prepared in Preparation Example 17 was used in place of Polarizing plate attached with a low refractive layer (a TAC substrate) 2A used in Example 7. The results of the evaluation of the obtained Liquid crystal display device 8 are shown in Table 1.

Comparative Example 1

Preparation of Liquid Crystal Display Device 9

A liquid crystal cell and the film of Optically anisotropic member E1 obtained in Preparation Example 5 were laminated in a manner such that the slow axis of the liquid crystal cell under application of no voltage and the slow axis of the film of Optically anisotropic member E1 were perpendicular to each other, and Optical laminate 3 was prepared.

The obtained Optical laminate 3 had a retardation of perpendicularly incident light ($R_0$) of 149 nm, retardations of light incident at the angle of 40 degrees with respect to the normal ($R_{40}$) of 167 nm in the $\alpha$-direction and 129 nm in the $\beta$-direction and values of $R_{40}/R_0$ of 1.12 in the $\alpha$-direction and 0.87 in the $\beta$-direction when the light had a wavelength of 550 nm.

Then, Polarizer P obtained in Preparation Example 15 was laminated with Optical laminate 3 in a manner such that the absorption axis of Polarizer P and the slow axis of the liquid crystal cell under application of no voltage were perpendicular to each other, and the face of Polarizer P on which no protective film was laminated was brought into contact with the liquid crystal cell.

Then, Polarizing plate attached with a low refractive index layer (the TAC substrate) 2A obtained Preparation Example 16 was laminated with Optical laminate 3 in a manner such that the absorption axis of Polarizing plate attached with a low refractive index layer (the TAC substrate) 2A and the slow axis of the film of Optically anisotropic member E1 were perpendicular to each other, and the face of Polarizing plate attached with a low refractive index layer (the TAC substrate) 2A on which no low refractive index layer was laminated was brought into contact with the film of Optically anisotropic member E1, and Liquid crystal display device 9 was prepared.

When the properties of display of the obtained liquid crystal display device were evaluated by visual observation, the quality of black depth was poor, and the contrast was small in viewing at the oblique angle of 45 degrees although the quality of display was excellent in viewing in the front direction. The results of the evaluation of the obtained Liquid crystal display device 9 are shown in Table 2.

Comparative Example 2

Preparation of Liquid Crystal Display Device 10

The film of Optically anisotropic member E1 obtained in Preparation Example 5, a liquid crystal cell and the film of Optically anisotropic member E1 were laminated in this order in a manner such that the slow axis of the first film of Optically anisotropic member E1 and the slow axis of the liquid crystal cell under application of no voltage were perpendicular to each other, and the slow axis of the liquid crystal cell under application of no voltage and the slow axis of the second film of Optically anisotropic member E1 were perpendicular to each other, and Optical laminate 4 was prepared.

The obtained Optical laminate 3 had a retardation of perpendicularly incident light ($R_0$) of 27 nm, retardations of light incident at the angle of 40 degrees with respect to the normal ($R_{40}$) of 32 nm in the $\alpha$-direction and 19 nm in the $\beta$-direction and values of $R_{40}/R_0$ of 1.19 in the $\alpha$-direction and 0.70 in the $\beta$-direction when the light had a wavelength of 550 nm.

Then, Polarizer P obtained in Preparation Example 15 was laminated with Optical laminate 4 in a manner such that the absorption axis of Polarizer P and the slow axis of the film of Optically anisotropic member E1 were parallel to each other, and the face of Polarizer P on which no protective film was laminated was brought into contact with the film of Optically anisotropic member E1.

Then, Polarizing plate attached with a low refractive index layer (the TAC substrate) 2A obtained Preparation Example 16 was laminated with the film of Optical laminate 4 in a manner such that the absorption axis of Polarizing plate attached with a low refractive index layer (the TAC substrate) 2A and the slow axis of the film of Optically anisotropic member E1 were perpendicular to each other, and the face of Polarizing plate attached with a low refractive index layer (the TAC substrate) 2A on which no low refractive index layer was laminated was brought into contact with the film of Optically anisotropic member E1, and Liquid crystal display device 10 was prepared.

When the properties of display of the obtained liquid crystal display device were evaluated by visual observation, the quality of black depth was poor, and the contrast was small in viewing at the oblique angle of 45 degrees although the quality of display was excellent in viewing in the front direction. The results of the evaluation of the obtained Liquid crystal display device 10 are shown in Table 2.

Comparative Example 3

Preparation of Liquid Crystal Display Device 11

Liquid crystal display device 11 was prepared in accordance with the same procedures as those conducted in Example 1 except that Laminate film 1A obtained in Preparation Example 16 was used in place of Polarizing plate attached with a low refractive layer (a TAC substrate) 2A used in Example 1. The results of the evaluation of the obtained Liquid crystal display device 11 are shown in Table 2.

Comparative Example 4

Preparation of Liquid Crystal Display Device 12

Polarizing plate attached with a low refractive index layer (a TAC substrate) 2G was prepared in accordance with the same procedures as those conducted in Preparation Example 16 except that Composition for forming a low refractive index layer L7 prepared in Preparation Example 13 was used in place of Composition for forming a low refractive index layer L1 used in Preparation Example 16.

Liquid crystal display device 12 was prepared in accordance with the same procedures as those conducted in Example 1 except that Polarizing plate attached with a low refractive index layer (a TAC substrate) 2G prepared above was used in place of Polarizing plate attached with a low refractive index layer (a TAC substrate) 2A used in Example 1. The results of the evaluation of the obtained Liquid crystal display device 12 are shown in Table 2.

TABLE 1-1

| | Example | | | |
|---|---|---|---|---|
| | 1 | 2 | 3 | 4 |
| $(\Sigma n_{xi} + \Sigma n_{yi})/\Sigma n_{zi}$ | 1.9989 | 1.9989 | 1.9989 | 1.9989 |
| $R_0$ (nm) | 201 | 201 | 201 | 201 |
| $R_{40}$ (nm) | | | | |
| α-direction | 198 | 198 | 198 | 198 |
| β-direction | 207 | 207 | 207 | 207 |
| $R_{40}/R_0$ | | | | |
| α-direction | 0.99 | 0.99 | 0.99 | 0.99 |
| β-direction | 1.03 | 1.03 | 1.03 | 1.03 |
| Refractive index | | | | |
| hard coat layer | 1.62 | 1.62 | 1.62 | 1.62 |
| low refractive index layer | 1.35 | 1.34 | 1.37 | 1.36 |
| Properties | | | | |
| angle of field | A | A | A | A |
| contrast ratio | 380 | 400 | 350 | 370 |
| reflectance (%) | 0.6 | 0.5 | 0.6 | 0.6 |
| wide band property | A | A | A | A |
| visibility | A | A | A | A |
| scratch resistance | A | A | A | A |

TABLE 1-2

| | Example | | | |
|---|---|---|---|---|
| | 5 | 6 | 7 | 8 |
| $(\Sigma n_{xi} + \Sigma n_{yi})/\Sigma n_{zi}$ | 1.9989 | 1.9989 | 1.9643 | 1.9643 |
| $R_0$ (nm) | 201 | 201 | 614 | 614 |
| $R_{40}$ (nm) | | | | |
| α-direction | 198 | 198 | 600 | 600 |
| β-direction | 207 | 207 | 633 | 633 |
| $R_{40}/R_0$ | | | | |
| α-direction | 0.99 | 0.99 | 0.98 | 0.98 |
| β-direction | 1.03 | 1.03 | 1.03 | 1.03 |
| Refractive index | | | | |
| hard coat layer | 1.62 | 1.62 | 1.62 | 1.62 |
| low refractive index layer | 1.36 | 1.33 | 1.35 | 1.37 |
| Properties | | | | |
| angle of field | A | A | A | A |
| contrast ratio | 370 | 420 | 330 | 300 |
| reflectance (%) | 0.6 | 0.4 | 0.6 | 0.6 |
| wide band property | A | A | A | A |
| visibility | A | A | A | A |
| scratch resistance | A | A | A | A |

TABLE 2

| | Comparative Example | | | |
|---|---|---|---|---|
| | 1 | 2 | 3 | 4 |
| $(\Sigma n_{xi} + \Sigma n_{yi})/\Sigma n_{zi}$ | — | 1.9989 | 1.9989 | 1.9989 |
| $R_0$ (nm) | 149 | 27 | 201 | 201 |
| $R_{40}$ (nm) | | | | |
| α-direction | 167 | 32 | 198 | 198 |
| β-direction | 129 | 19 | 207 | 207 |
| $R_{40}/R_0$ | | | | |
| α-direction | 1.12 | 1.19 | 0.99 | 0.99 |
| β-direction | 0.87 | 0.70 | 1.03 | 1.03 |
| Refractive index | | | | |
| hard coat layer | 1.62 | 1.62 | 1.62 | 1.62 |
| low refractive index layer | 1.35 | 1.35 | — | 1.40 |
| Properties | | | | |
| angle of field | B | B | A | A |
| contrast ratio | 150 | 150 | 200 | 250 |
| reflectance (%) | 0.6 | 0.6 | 5.0 | 1.3 |
| wide band property | A | A | — | A |
| visibility | A | A | B | AB |
| scratch resistance | A | A | B | A |

As shown in Table 1, the liquid crystal display devices of Examples 1 to 8, which had two optically anisotropic members satisfying the relation $(\Sigma n_{xi}+\Sigma n_{yi})/2 \leq \Sigma n_{zi}$ between a pair of polarizers, a value of $R_{40}/R_0$ of 0.98 to 1.03 and a low refractive index layer which comprised a cured coating film of a silicone containing hollow fine particles of silica, was disposed at the side of observation of the face of the protective film at the side of observation of the polarizer at the output side and had a refractive index of 1.33 to 1.37, had the excellent and uniform display screen and a high contrast ratio in viewing in the front direction and in oblique directions. The reflectance was as small as 0.4 to 0.6%. The color of reflected light was black, and the wide band property was excellent. No glare or reflection of outside light was found, and the visibility was excellent. No scratches were formed by rubbing with steel wool, and the excellent scratch resistance was exhibited.

In contrast, as shown in Table 2, the liquid crystal display of Comparative Example 1 which had a single optically anisotropic member alone and had a value of $R_{40}/R_0$ in the α-direction of 1.12 and a value of $R_{40}/R_0$ in the β-direction of 0.87 had a poor angle of field and a small contrast ratio. The liquid crystal display of Comparative Example 2 which had a value of $R_{40}/R_0$ in the α-direction of 1.19 and a value of $R_{40}/R_0$ in the β-direction of 0.70 had a poor angle of field and a small contrast ratio. The liquid crystal display of Comparative Example 3 which had no low refractive index layer at the side of observation of the face of the protective film at the side of observation of the polarizer at the output side had a small contrast ratio, a high reflectance and poor visibility and scratch resistance. The liquid crystal display of Comparative Example 4 which had a refractive index of the low refractive index layer of 1.40 had a rather small contrast ratio and poor visibility due to the presence of some glare and reflection.

INDUSTRIAL APPLICABILITY

The liquid crystal display device of the present invention has excellent antireflection property and scratch resistance, can prevent the decrease in the contrast in viewing in oblique directions without decreasing the properties of images in the front direction and exhibits excellent quality of the black depth and a uniform and high contrast in viewing in any desired directions. The liquid crystal display device of the present invention is suitable for flat panel displays of a large size.

The invention claimed is:

1. A liquid crystal display device of an in-plane switching mode which comprises a pair of polarizing plates, which are constituted with a polarizing plate at an output side comprising a polarizer at an output side and a polarizing plate at an incident side comprising a polarizer at an incident side having a transmission axis approximately perpendicular to a transmission axis of the polarizer at an output side, and k sheets (k representing an integer of 2 or greater) of all optically anisotropic members and liquid crystal cells which are disposed between the pair of polarizing plates, wherein
a relation:

$$(\Sigma n_{xi} + \Sigma n_{yi})/2 \leq \Sigma n_{zi}$$

is satisfied, wherein major in-plane refractive indices of an i-th optically anisotropic member are represented by $n_{xi}$ and $n_{yi}$ ($n_{xi} > n_{yi}$), a major refractive index in a direction of thickness is represented by $n_{zi}$, and $\Sigma$ shows a sum for i=1~k;
a relation:

$$0.90 < R_{40}/R_0 < 1.10$$

is satisfied, wherein, in Optical laminate (O) formed by laminating k sheets of optically anisotropic members and liquid crystal cells, a retardation of light having a wavelength of 550 nm incident perpendicularly is represented by $R_0$, and a retardation of light having a wavelength of 550 nm incident at an angle inclined by 40 degrees with respect to a normal toward a major axis is represented by $R_{40}$; and
the polarizing plate at an output side comprises protective films disposed on both faces of the polarizer at an output side and a low refractive index layer which has a refractive index of 1.37 or smaller, comprises a cured coating film of a silicone coating material composition comprising hollow fine particles or porous fine particles and is disposed at a side of observation of a face of the protective film at a side of observation of the polarizer at an output side.

2. The liquid crystal display device according to claim 1, wherein the low refractive index layer is a cured coating film of a silicone coating material composition which comprises the hollow fine particles or the porous fine particles, at least one of a hydrolyzate shown in (A) in the following and a copolymer hydrolyzate shown in (B) in the following, and a hydrolyzable organosilane shown in (C) in the following:

(A) A hydrolyzate obtained by hydrolysis of a hydrolyzable organosilane represented by general formula [1]:

$$SiX_4 \qquad [1]$$

wherein X represents a hydrolyzable group;

(B) A copolymer hydrolyzate obtained by hydrolysis of a copolymer of a hydrolyzable organosilane represented by general formula [1] and a hydrolyzable organosilane having an alkyl group substituted with fluorine atom; and (C) A hydrolyzable organosilane having a water-repelling group at a linear chain portion and two or more silicon atoms having a bonded alkoxyl group in a molecule.

3. The liquid crystal display device according to Claim 2, wherein the water-repelling group in the hydrolyzable organosilane shown in (C) has a structure represented by general formula [2] or [3]:

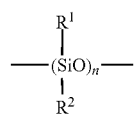

[2]

wherein $R^1$ and $R^2$ represent alkyl groups, and n represents an integer of 2 to 200;

$$—(CF_2)_m— \qquad [3]$$

wherein m represents an integer of 2 to 20.

4. The liquid crystal display device according to Claim 2, wherein the porous fine particles comprised in the silicone coating material composition forming the low refractive index layer are (a) porous particles which are obtained by mixing an alkoxysilane with a solvent, water and a catalyst for polymerization with hydrolysis, followed by polymerizing the mixture with hydrolysis and then removing the solvent, (b) porous particles having an average diameter of aggregation of 10 to 100 nm which are obtained by mixing an alkoxysilane with a solvent, water and a catalyst for polymerization with hydrolysis, followed by polymerizing the mixture with hydrolysis, stabilizing a formed organosilica sol by terminating the polymerization before formation of a gel and then removing the solvent from the organosilica sol, or a mixture of porous particles (a) and (b).

5. The liquid crystal display device according to Claim 2, wherein the hydrolyzate shown in (A) obtained by hydrolysis of the hydrolyzable organosilane represented by general formula [1] is a partial hydrolyzate or a complete hydrolyzate having a weight-average molecular weight of 2,000 or greater which is obtained by hydrolysis of the hydrolyzable organosilane represented by general formula [1] in presence of water in an amount such that a ratio of amounts by mole [H$_2$O]/[X] is 1.0 to 5.0 and an acid catalyst.

6. The liquid crystal display device according to claim 1, wherein the low refractive index layer is a cured coating film of a silicone coating material composition which comprises the hollow fine particles or the porous fine particles, at least one of a hydrolyzate shown in (A) in the following and a copolymer hydrolyzate shown in (B) in the following, and a siliconediol shown in (D) in the following:

(A) A hydrolyzate obtained by hydrolysis of a hydrolyzable organosilane represented by general formula [1]:

$$SiX_4 \qquad [1]$$

wherein X represents a hydrolyzable group;

(B) A copolymer hydrolyzate obtained by hydrolysis of a copolymer of a hydrolyzable organosilane represented by general formula [1] and a hydrolyzable organosilane having an alkyl group substituted with fluorine atom; and (D) A siliconediol of a dimethyl type represented by general formula [4]:

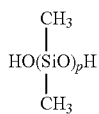

[4]

wherein p represents a positive integer.

7. The liquid crystal display device according to Claim 6, wherein p represents an integer of 20 to 100.

8. The liquid crystal display device according to Claim 6, wherein the porous fine particles comprised in the silicone coating material composition forming the low refractive index layer are (a) porous particles which are obtained by mixing an alkoxysilane with a solvent, water and a catalyst for polymerization with hydrolysis, followed by polymerizing the mixture with hydrolysis and then removing the solvent, (b) porous particles having an average diameter of aggregation of 10 to 100 nm which are obtained by mixing an alkoxysilane with a solvent, water and a catalyst for polymerization with hydrolysis, followed by polymerizing the mixture with hydrolysis, stabilizing a formed organosilica sol by terminating the polymerization before formation of a gel and then removing the solvent from the organosilica sol, or a mixture of porous particles (a) and (b).

9. The liquid crystal display device according to Claim 6, wherein the hydrolyzate shown in (A) obtained by hydrolysis of the hydrolyzable organosilane represented by general formula [1] is a partial hydrolyzate or a complete hydrolyzate having a weight-average molecular weight of 2,000 or greater which is obtained by hydrolysis of the hydrolyzable organosilane represented by general formula [1] in presence of water in an amount such that a ratio of amounts by mole [$H_2O$]/[X] is 1.0 to 5.0 and an acid catalyst.

10. The liquid crystal display device according to claim 1, wherein the low refractive index layer is a cured coating film of a silicone coating material composition which comprises a re-hydrolyzate, which is obtained by hydrolysis of a hydrolyzate shown in (A) in the following in a condition such that the hydrolyzate is mixed with the hollow fine particles or the porous fine particles, and a copolymer hydrolyzate shown in (B) in the following:

(A) A hydrolyzate obtained by hydrolysis of a hydrolyzable organosilane represented by general formula [1]:

 [1]

wherein X represents a hydrolyzable group; and (B) A copolymer hydrolyzate obtained by hydrolysis of a copolymer of a hydrolyzable organosilane represented by general formula [1] and a hydrolyzable organosilane having an alkyl group substituted with fluorine atom.

11. The liquid crystal display device according to claim 1, wherein the transmission axis of the polarizer at an output side or the transmission axis of the polarizer at an incident side, and a slow axis of Optical laminate (O) are approximately parallel or perpendicular to each other.

12. The liquid crystal display device according to claim 1, wherein a slow axis of the optically anisotropic member and a slow axis of liquid crystal molecules in the liquid crystal cell under application of no voltage are approximately parallel or perpendicular to each other.

13. The liquid crystal display device according to claim 1, wherein at least one of the optically anisotropic members is a layer comprising a material having a negative intrinsic birefringence.

14. The liquid crystal display device according to claim 1, wherein at least one of the optically anisotropic members is a layer comprising discotic liquid crystal molecules or lyotropic liquid crystal molecules.

15. The liquid crystal display device according to claim 1, wherein at least one of the optically anisotropic members is a layer comprising a photo-isomerizable substance.

* * * * *